(12) United States Patent
Shrim et al.

(10) Patent No.: US 6,517,967 B1
(45) Date of Patent: Feb. 11, 2003

(54) BATTERY PACK DESIGN FOR METAL-AIR BATTERY CELLS

(75) Inventors: Yaron Shrim, Jerusalem (IL); Menachem Givon, Hanegev (IL); Tzvi Rosenberg, Mevaseret Tziyon (IL); Neal Naimer, DN Shikmim (IL); Mariano Abramson, Jerusalem (IL); Jonathan Goldstein, Jerusalem (IL); Mark Slutski, Jerusalem (IL)

(73) Assignee: Electric Fuel Limited, Bet Shemesh (IL)

( * ) Notice: Subject to any disclaimer, the term of this patent is extended or adjusted under 35 U.S.C. 154(b) by 0 days.

(21) Appl. No.: 09/293,927

(22) Filed: Apr. 15, 1999

Related U.S. Application Data

(60) Provisional application No. 60/112,292, filed on Dec. 15, 1998, and provisional application No. 60/119,568, filed on Feb. 10, 1999.

(51) Int. Cl.⁷ ................................................ H01M 2/00
(52) U.S. Cl. ........................................ 429/148; 429/159
(58) Field of Search ............................ 429/82, 86, 148, 429/157, 159, 162, 178

(56) References Cited

U.S. PATENT DOCUMENTS 4,547,438 A * 10/1985 McArthur et al. ............. 429/82
5,242,763 A * 9/1993 Konishi et al. ............... 429/27

* cited by examiner

Primary Examiner—Patrick Ryan
Assistant Examiner—M. Wills
(74) Attorney, Agent, or Firm—Lyon & Lyon, LLP

(57) ABSTRACT

A high capacity primary (single-use; non-rechargeable) battery pack for high current portable appliances such as cellular phones employs electrochemical cells that use ambient oxygen for one of the electrodes. The pack makes possible a simple low cost design by providing for oxygen supply in a completely passive yet compact configuration. Cells may be arranged inside a housing in a tightly packed arrangement by providing internal spaces that are sized to permit diffusion and, if possible, bulk air flow. The highest volumetric energy density is achievable by permitting bulk flow of air into the housing. It has been found that in practical use, in applications such as cellular telephones, that bulk air flow can play a significant role in gas exchange required for operation. A number of design criteria are developed for providing for a mix of molecular diffusion and bulk flow in the design of battery packs according to the invention. Most of these criteria relate to providing for gas exchange to portions of cells that are housed deep within the housing structure without requiring large amounts of physical space that would undermine the design goal of compactness. These criteria permit portions of cells to be positioned remotely from openings in the housing while still providing adequate oxygen delivery.

32 Claims, 21 Drawing Sheets

BATTERY PACK DESIGN FOR METAL-AIR BATTERY CELLS

This application claims benefit of Provisional Application Ser. No. 60/112,292 filed Dec. 15, 1998, also claims benefit of Provisional Application Ser. No. 60/119,568 filed Feb. 10, 1999.

FIELD OF THE INVENTION

The present invention relates to disposable battery packs containing electrochemical cells. More particularly, the present invention has features relating to such packs that are disposable and which contain at least one cell that requires a gas exchange with ambient atmosphere.

BACKGROUND OF THE INVENTION

Most high-drain portable electronic devices are powered by secondary or rechargeable batteries. Examples of such high-drain devices are cellular telephones, notebook computers, camcorders, and cordless hand-tools. The reason primary batteries are unattractive in such applications is that the life-span of a typical primary or single-use batteries is so short, and the cost so high, that they ultimately prove too costly for long-term use. In addition, their weight alone would discourage a person from carrying enough primary batteries for a long-term operation of the device. For example, a cellular telephone with alkaline batteries would last about as long as a single charge of a nickel-metal-hydride battery, but in the long term, cost far more per unit energy. A nickel-metal hydride battery, though initially expensive, costs only pennies to recharge.

New primary battery technologies have emerged that have, in principle at least, the ability to offer sufficient energy and power at a sufficiently low cost to make these batteries attractive for high-drain portable devices. One such technology is metal-air batteries, for example zinc-air batteries. In a zinc-air battery, one of the electrodes of the battery uses oxygen that can be supplied by ambient oxygen. Since oxygen is available everywhere, a zinc-air battery need house only one consumable electrode. Because of this, the energy capacity per unit weight is magnified greatly. Unfortunately, the intrinsic benefits of electrochemical cells that use air as an electrode are attended by some serious technical problems.

Typical zinc-air cells, such as those in hearing aid batteries, have holes in their casings to admit air. These holes permit oxygen to diffuse into the cell and also permit water vapor to escape. For larger batteries with high power capacity, multiple cells must be used. In such large combinations, the exchange of these gases becomes a real problem as discussed below.

Although zinc-air batteries have high energy densities, they are moderately low on power. To increase their power, large amounts of oxygen must be supplied. This creates some obvious design problems for hand-held consumer devices. Many small portable electronic devices have battery compartments that are narrow with a small opening for exchanging the batteries when they are depleted. These configurations provide little area for the exchange of air gases with the outside. A typical zinc-air battery for use in a hearing aid would require a total surface area of approximately 200 cm$^2$ to generate sufficient power to operate a typical digital telephone. To expose such a large area to the outside would require a dramatic rethinking of the way batteries are housed by appliances.

One solution is to pump air into and through the battery pack. So called active air management systems can pump large amounts of air through a small opening. However, these systems usually require an air pump that can be difficult to fit into the cost and volume constraints of a disposable battery.

An additional problem with metal-air batteries is the fact that, because oxygen must enter the battery, water vapor can leave the battery. As such, metal-air batteries are susceptible to desiccation in low humidity environments, which can destroy their ability to function.

Leakage of water between or onto metal-air batteries is also a concern. Water from a multitude of sources can potentially enter the battery pack. Intruding water can then contact the metal-air battery cells and cause electrical shorts. Sources of such water include sweat from the person handling the device, moisture from speaking near or into the device, or simply from water spilled onto the device.

Finally, portable electronic devices place constraints on battery weight and volume. The battery cell must be sized to deliver, cost effectively, required power while also conforming to the various shapes, sizes, voltages, amperages, etc. of cellular telephones, notebook computers, camcorders, and cordless hand-tools.

SUMMARY OF THE INVENTION

A battery pack, in at least one embodiment of the invention, contains at least one battery cell that uses an air electrode. One of the goals of the invention is to improve the passive exchange of air gases with electrochemical cells housed in the pack. The embodiments described below provide compact configurations that are compatible with small portable high current electronic devices. Further, design strategies and guidelines are provided for applications other than those discussed herein.

A paradigmatic use of the invention is as a primary battery for cellular or mobile telephones. The battery pack is capable of replacing or supplementing existing, commonly used, secondary (rechargeable) power supplies such as a nickel-metal hydride battery.

Typically, metal-air battery cells include an outer case wall having one or more holes to permit diffusion of oxygen from ambient air. The metal-air battery cell generates power through electrochemical reactions. To generate power, an oxygen-reducing catalyst, in an air cathode inside the battery cell, catalyzes the conversion of oxygen to hydroxyl ions. The hydroxyl ions then migrate to the anode where the anode metal oxidizes. Electrons are liberated by the anode and pumped through the load to offset the deficit generated by the oxygen reduction in the cathode. A preferable metal for the anode in these types of battery cells, is zinc.

For metal-air batteries to provide high power, large amounts of oxygen must pass into the metal-air battery cells (up to 0.0032 cc/sec/cm$^2$). This creates some obvious design problems for hand-held consumer electronic devices. Small portable electronic devices provide little surface area for air access through the battery pack case. Moreover, the metal-air battery cells themselves must be designed so as to insure adequate oxygen delivery through the cell.

The battery pack is designed in accord with the goal of delivering an adequate supply of oxygen to generate enough current to power computers and cell phones while optimally balancing the sometimes competing goals of improving the efficiency of supplying oxygen to the cathode and minimizing moisture loss. In addition, the design is in accord with the goals of providing a compact and flexible mechanical configuration, reducing the cost and complexity of the pack, and increasing the energy density of the pack.

Most of the battery pack features discussed herein stem from the advantages and constraints of a prism-shaped cell design.

At the cell level, the total area, the placement, and the size of each hole on the battery cell reflect an optimization of the needs of manufacturability, efficient oxygen supply to the cathode, and minimal moisture loss as discussed in the applications mentioned above.

To support the cell's demand for oxygen, an ideal scenario would be for each cell to be continuously immersed in fresh, oxygen rich air. In that case, the driving gradient of oxygen is maximized. The pack designs described herein employ various principles in combination to provide oxygen delivery at a rate that is compatible with the high current demands of the above-noted applications.

When arranging cells inside the case, as many cells as possible should be oriented so that their gas-exchange walls face an external wall of the housing. (Note that a single cell may have more than one gas-exchange wall) The external wall of the housing is populated with holes. The short distance between the gas-exchange walls and the ambient air coupled with the abundance of holes on the housing ensure that oxygen can passively diffuse at a rate adequate to satisfy the oxygen requirements of the cells. The number of cells needed to generate the necessary level of current and to hold a sufficient quantity of energy, together with the form-factor requirements, may make it impossible for a designer to orient the cells so that they all face the exterior of the housing. Additionally, cells can be added and arranged to define internal plenums within the housing. Ventilation holes on opposite sides of the plenum permit bulk flow as well as a diffusion of air so that sufficient oxygen can reach every cell. This strategy requires adherence to an array of design principles that are set forth below.

Bulk flow can result from buoyancy (resulting from heat generated by an attached device or generated by the battery cells themselves) or movement of ambient air relative to the device. The latter happens, for example, when the person moves the device around, when a gust of wind passes through, etc. The former, thermally-driven, bulk air flow is called the "stack effect." The effect is caused by the pressure difference resulting from buoyancy caused by the difference in temperature inside the case compared to that outside the case. The temperature difference is maintained when the device or battery cells generates heat, such as during a high-power operation or transiently when the device and battery pack are moved from an environment at one temperature to an environment at a different temperature.

The battery pack case preferably contains holes all throughout the case, which, because of their cumulative open area and location, ensure adequate oxygen delivery to the battery cells. Alternatively, a porous plastic or semipermeable membranes or materials, which permit a sufficient air exchange through the battery pack case, may be used in place of holes.

Ingress, into the battery cell, of the oxygen necessary for discharge is driven by Fick's Law. A difference in the partial pressure of oxygen across the surface of the battery cell forces air to diffuse through the air access holes of the battery cell and into the air cathode. This difference in partial pressure of oxygen across the surface of the metal-air battery cell occurs due to the depletion of oxygen inside the battery cell when the oxygen is converted to hydroxyl ions.

The inadvertent blockage of holes on the battery pack case can also pose a problem in the supply of oxygen to the metal-air battery cells. To alleviate this problem, the battery pack case must have sufficient air access openings that remain unobstructed when the case is in contact with an obstruction to allow adequate air access. Alternatively, the battery pack case surface provides a plurality of projections to maintain the blocking surface a minimum distance away from the air access holes, thereby preventing blockage. Alternatively, the air access holes are located in a plurality of indentations, recesses, or grooves on the surface of the battery pack case, preventing the holes from being sealed by a blocking surface.

Ultimately, loss of electrolyte, due to evaporation (cell dryout), can cause a cell to stop functioning before complete discharge. The egress of water from inside the metal-air battery cells is caused by a higher partial pressure of water ($ppH_2O$) on the interior of the battery cell than on the exterior of the battery cell. Under such conditions, moisture will diffuse through the air access holes. Since the $ppH_2O$ inside the battery cell is usually greater than the $ppH_2O$ of the atmosphere, moisture normally diffuses out of the battery cell.

To reduce dryout, the sizing of the air access holes on the gas-exchange wall of the metal-air battery cell is designed to strike the most favorable balance between the demand for oxygen and inhibition of evaporative loss of water from the battery cell. This balance is struck by making the hole size as small as practical, which is essentially a question of manufacturing cost-effect, and by spacing the holes as far apart as possible without substantially reducing the efficacy of the battery cell's oxygen take-up.

To prevent the entry of water into the battery pack and the accidental shorting of the metal-air battery cells, air access holes on the battery pack case are sized and/or positioned to inhibit the entry of water into the battery pack. This prevents water from contacting the battery cells and causing shorts. The battery pack case may also be constructed of hydrophobic material. In this case, holes on the case may be sized small enough to cause water to bead up, preventing the penetration of water through the case. Also, air access holes in the battery pack case can be located on bumps or ridges on the case, creating channels (between the bumps or ridges) through which water is directed away from the air access holes.

In an additional embodiment, a hydrophobic material is placed inside the battery cell case to prevent the leakage of electrolyte. Electrolyte may leak out of the battery cell and into the battery case when the cell is exposed to adverse conditions, such as when the cell is subject to high temperatures or high pressure. The material reduces the gravity and likelihood of electrolyte leakage.

To provide for the secure placement of the metal-air battery cells in the battery pack (battery cell stability in a pack), a plurality of battery cells are held by an internal support structure that separates the battery cells and keeps them from moving around. One type of structure contains a plurality of compartments into which the battery cells may be positioned. The compartments have projections that secure the battery cells by a snap-fit. The structure may then be securely connected to the battery pack case. Alternatively, the battery pack case itself may be provided with a plurality of projections that allow the individual metal-air battery cells, or the structure containing the plurality of battery cells, to snap in place. Battery cell compartments can also be joined by a living hinge with each compartment containing standoffs to aid in the separation of the battery cells. To alleviate the problem due to the inevitable expansion of the metal-air battery cells (e.g., due to zinc-oxide formation), the support structure can be flexible so as to accommodate changes in the shape of the battery cells.

Another issue with metal-air batteries is the small space that consumers expect batteries to require in common high current portable electronic devices. The present invention uses prismatic metal-air battery cells designed to minimize wasted space by providing a high packing density, allowing for a compact battery pack.

Metal-air batteries cannot tolerate charging. However, many hands-free adapters automatically charge batteries when they are connected to the adapters. To prevent charging or limit charging to acceptable levels, internal circuitry or external components may be added to prevent the charging of battery cell (e.g., a current cutoff switch) or limit the charging of the battery cell to a controlled rate.

According to an embodiment, the invention provides a battery case housing at least one metal-air battery cell. The case has a holder supporting the battery cell(s) in a predefined position inside the case. The holder and a remainder of the case are configured to define, together with the battery cell(s), an air conduit inside the case. The air conduit can be any kind of internal space, the only requirement is that it define some kind of path along which air may flow between openings in a wall of the case. The flow path has a cross section with a hydraulic diameter that can easily be calculated. The conduit also has a flow length between openings at opposite ends thereof. The conduit is shaped to insure a minimum value of a ratio of the square of the hydraulic diameter to the length of the flow path is at least 0.5 mm. The openings may be sized to have minimum respective hydraulic diameters of at least 3 mm to allow for good air flow into and out of the air conduit. Preferably, the conduit hydraulic diameter is substantially uniform along the flow path.

According to another embodiment, the invention provides a battery case housing at least one metal-air battery cell. The cell(s) has a respective gas-exchange wall through which gas exchange between an interior and exterior of the cell(s) takes place. The case housing has a holder configured to support the cell(s) in (a) predefined position(s) inside the case. The holder and a remainder of the case are configured to define, together with the cell(s)' gas-exchange wall, an internal volume inside the case. The case has at least one opening in its external walls to provide a gas exchange interface between the exterior of the case and the internal volume. The opening(s) has a combined area of at least 300 mm$^2$/watt of peak power capacity of the cell(s) exchanging air gases through the opening(s). Preferably there are at least two openings on opposing sides of the internal volume with the internal volume connecting the two to form a flow conduit. The conduit has a cross section with a hydraulic diameter that can easily be calculated. The conduit also has a flow length between openings at opposite ends thereof. The conduit is shaped to insure a minimum value of a ratio of the square of the hydraulic diameter to the length of the flow path is at least 0.5 mm.

According to still another embodiment, the invention provides a battery case for housing at least one metal-air battery cell. The cell has a respective gas-exchange wall through which gas exchange between an interior and exterior of the cell(s) takes place. The case has a housing with at least one aperture providing communication between an exterior of the housing and the air conduit. Also, a holder is configured to support the cell(s) in a predefined position inside the case. The holder and the case are configured to define, together with the cell(s) at least one gas-exchange wall. An air conduit is defined by the case structure and at least part of the conduit is lined by the gas-exchange wall. The conduit has a clearance equal to a minimum dimension in a direction substantially normal to the cell(s)' gas-exchange wall. The holder and the housing are further configured such that a distance between a portion of the cell(s)' gas-exchange wall that is most remote from the aperture(s) is no greater than twenty times the overhead clearance. The overhead clearance is the thickness of the conduit in a direction normal to the gas-exchange wall. Preferably, in this embodiment, there are at least two apertures on opposing sides of the conduit and the conduit is characterized by a ratio of hydraulic diameter of flow cross section to flow length between the openings of at least 0.5 mm. Further, preferably in combination with the last feature or alone, the aperture(s) have a combined area of at least 300 mm$^2$/watt of peak power capacity of the cell(s) exchanging air gases through the aperture(s).

According to still another embodiment, the invention provides a battery case for housing at least one metal-air battery cell. The cell(s) has at least one gas-exchange wall for permitting diffusion of gases between the interior cell(s) and the exterior of the cell(s). The case has a holder configured to support the cell(s) in a predefined position inside the case. The holder and a remainder of the case are configured to define, together with the cell(s), an air conduit inside the case. There are opening(s) in the case wall in communication with the air conduit. The conduit has a depth in a direction normal to a major plane of the gas-exchange wall(s) large enough to accommodate the expansion of the cell(s) while leaving a minimum of 2 mm remainder of the depth. Preferably, there are at least two openings on opposing ends of the conduit and the conduit is characterized by a ratio of hydraulic diameter of flow cross section to flow length between the openings of at least 0.5 mm. Preferably, alone or in concert with the prior features, the opening(s) has a combined area of at least 300 mm$^2$/watt of peak power capacity of the cell(s) exchanging air gases through the opening(s). Preferably, either alone or in addition to the previous features, the opening(s) has a hydraulic diameter of at least 3 mm.

According to still another embodiment, the invention provides a battery case for supporting at least one metal-air battery cell. The cell has at least one surface with holes for permitting diffusion of gas therethrough. The case has a holder configured to support the cell(s) in a predefined position inside the case. The holder and a remainder of the case are configured to define, together with the cell(s), an air conduit inside the case. Openings in the case wall provide communication with the air conduit, at least two of the openings lying at opposite ends of the conduit. Preferably, the first and second openings can be joined by a straight line that passes through conduit without touching boundaries of the conduit. Preferably, the conduit has a first major axis defining a first linear flow path linking first and second apertures and the openings lie directly adjacent the conduit to minimize a flow resistance of the conduit. Preferably, the openings are sized to be a substantial fraction of a hydraulic diameter of the conduit. Preferably, the conduit is characterized by a ratio of hydraulic diameter of flow cross section to flow length between the of the openings of at least 0.5 mm. Further, it is preferable that the openings have respective hydraulic diameters of at least 3 mm.

According to still another embodiment, the invention provides a battery case for supporting at least one metal-air battery cell. The case has a holder configured to support the cell(s) in a predefined position inside the case. The holder and a remainder of the case are configured to define, together with the cell(s), an air conduit inside the case. At least one opening in the case wall is communication with the air conduit. The conduit has a substantially uniform hydraulic diameter. The cell(s) has a respective gas-exchange wall through which gas exchange between an interior and exterior of the cell(s) takes place. The conduit has a clearance equal to a minimum dimension in a direction substantially normal to the cell(s)' gas-exchange wall. The holder and the housing are further configured such that a certain ratio of distances is no more than twenty. The numerator of this ratio is the distance between a portion of the cell(s)' gas-exchange wall that is most remote from an opening to that nearest opening(s). The denominator is the overhead clearance. That is, one finds the portion of gas-exchange wall (or the hole through which gas is exchanged) that is furthest from a case opening. Then measure the distance from the nearest opening to that portion (or cell hole). This distance is the numerator of the ratio. The denominator is simply the distance in a direction normal to the cell gas-exchange wall to the opposite face of the conduit. Preferably the opening(s) is at least two openings on opposing ends of the conduit and the conduit is characterized by a ratio of hydraulic diameter of flow cross section to flow length between the of the openings of at least 0.5 mm. Also, preferably, the opening(s) has a combined area of at least 300 $mm^2$/watt of peak power capacity of the cell(s) exchanging air gases through the opening(s).

According to still another embodiment, the invention provides a battery case for supporting at least one metal-air battery cell. The case has a holder configured to support the cell(s) in a predefined position inside the case. The holder and a remainder of the case are configured to define, together with the cell(s), an air conduit inside the case. Openings in the case wall provide communication with the conduit. The openings are located directly adjacent the conduit such that a substantially contiguous flow path is defined, whereby a possibility of flow short-circuiting of the conduit by any two of the openings is minimized. Preferably, at least two of the openings lie at opposite ends of the conduit. Also preferably, the conduit is substantially a sole means for air to flow from at least two first and second oppositely positioned openings in the case.

According to still another embodiment, the invention provides a battery pack with a housing. The housing has apertures permitting gas exchange between the interior and the exterior of the housing. Electrochemical cells exchange gas with ambient air via gas-exchange wall coinciding with a major plane thereof. The cells are supported inside the case. Each cell also has a back surface opposite the gas-exchange wall, the gas-exchange wall allows for gas exchange between the interior and exterior of the cells. First and second of the cells are arranged with the back surfaces adjacent and held in a position such that the gas-exchange wall of the first of the cells faces the housing. This defines a first air space between the housing and the gas-exchange wall. The gas-exchange wall of the second of the cells faces a second air space. A thickness of the second air space is substantially thicker than a thickness of the first air space. Preferably, the first interior space is at least 0.5 mm in thickness, the thickness being a dimension normal to the gas-exchange wall. Preferably, the second interior space is at least 4 mm in thickness, the thickness being a dimension normal to the gas-exchange wall. Preferably, the second interior space is at least 2.5 mm in thickness.

According to still another embodiment, the invention provides a battery pack with a housing having apertures permitting gas exchange between the interior and exterior thereof. Prismatic metal-air electrochemical cells are supported inside the housing. Each of the cells has at least one gas-exchange wall coinciding with a major plane thereof and a back surface opposite the gas-exchange wall. The gas-exchange wall is such that gas exchange between respective interiors and exteriors of the cells may occur. First and second of the cells are arranged with the gas-exchange walls thereof facing and opposite each other such that their gas-exchange walls define an air space therebetween. A thickness of the air space is a minimum of 0.5 mm, the thickness being a dimension normal to the gas-exchange walls of the first and second of the cells.

According to still another embodiment, the invention provides a battery pack with a housing. The housing has at least one aperture permitting a gas exchange between an interior and an exterior thereof. Prismatic metal-air electrochemical cells are supported inside the housing. Each of the cells has at least one gas-exchange wall coinciding with a major plane thereof and a back surface opposite the gas-exchange wall, the gas-exchange wall being such that gas exchange between respective interiors and exteriors of the cells may occur. First and second of the cells are arranged with the gas-exchange walls thereof facing and opposite each other such that their gas-exchange walls define an air space therebetween. A thickness of the air space is a minimum of 4 mm, the thickness being a dimension normal to the gas-exchange walls of the first and second of the cells. Preferably, a distance between a portion of the exchange surfaces most remote from an aperture(s) to the closest aperture is no greater than twenty times the thickness of the air space. Preferably, there are at least two apertures on opposing ends of the air space to define a flow conduit for bulk flow of air and the conduit is characterized by a ratio of a square of the hydraulic diameter of flow cross section to flow length between the apertures of at least 0.5 mm. Preferably, the aperture(s) has a combined area of at least 300 $mm^2$/watt of peak power capacity of the cells exchanging air gases through the aperture(s). Preferably, the pack has the following features in combination: (1) aperture(s) with a combined area of at least 300 $mm^2$/watt of peak power capacity of the cells exchanging air gases through the aperture(s), (2) there are at least two apertures on opposing ends of the air space to define a flow conduit for bulk flow of air, and (3) the conduit is characterized by a ratio of hydraulic diameter of flow cross section to flow length between the apertures of at least 0.5 mm. Preferably, at least some of the aperture(s) are immediately adjacent the air space, thereby defining a contiguous unobstructed path for exchange of air gases.

According to still another embodiment, the invention provides a battery case connectable to a portable hand-held device for supporting at least one metal-air battery cell. The case has a holder configured to support the cell(s) in a predefined position inside the case. The holder and a remainder of the case are configured to define, together with the cell(s), an air conduit inside the case. Openings in the case wall provide air communication with the conduit. A first and a second series of the openings are positioned such that, for all possible normal manual holding positions of the case hand-held device-combination, at least one of the first series and at least one of the second series remain unobstructed. The holes are sized, shaped, numbered and/or located to insure that flow through the conduit between at least one of the first series at least one of the second series remains possible. Preferably, the first and second series of openings lie at opposite ends of the conduit. Preferably, the case is shaped such that a substantial number of the openings cannot be blocked by a flat surface.

According to still another embodiment, the invention provides a battery case for supporting at least one metal-air battery cell. The case has an internal support for holding the cell(s) and a housing with openings to supply air to the cell(s). The case has channels defined in a surface of the case. The openings are located in the channels such that a surface resting against the case is prevented from covering the openings thereby permitting air to enter the openings when the flat surface rests against the case.

According to still another embodiment, the invention provides a battery case for supporting at least one metal-air battery cell, having a housing with openings therein. A material of the housing and a size of the openings in the housing are such that a surface tension of water substantially prevents entry of water droplets into the housing. The housing has a hydrophobic surface.

According to still another embodiment, the invention provides a battery case for supporting at least one metal-air battery cell. The case has a housing with openings therein. The housing has raised portions defining channels for conducting fluid therebetween. The openings are located on the raised portions such that the openings are maintained at positions remote from liquid in the channels. Thus, the liquid is conducted away from the openings.

According to still another embodiment, the invention provides a metal-air battery power supply. The power supply has a current limiter, and a metal-air battery cell. There is a connector of the metal-air battery cell that is connectable to a charging source. The device has a switch between the battery cell and the connector configured to selectively interpose the current limiter between the connector and the battery cell.

According to still another embodiment, the invention provides a metal-air battery power supply. The power supply has a current limiter and a metal-air battery cell. There is a connector of the metal-air battery cell that is connectable to a charging source. The device has a controller programmed to selectively interpose the current limiter between the connector and the battery cell.

According to still another embodiment, the invention provides a metal-air battery power supply with a metal-air battery cell. The power supply is for connection to a portable device. The portable device has terminals for connecting to a portable power source. An adapter on the portable device is connectable to a battery charger connected through the portable device to the terminals. The battery cell has a current limiter connectable between the terminals and the metal-air battery cell to prevent over-charging of the battery cell. Preferably, the power supply has a controller programmed to selectively interpose the current limiter between the terminals and the cell(s). Preferably, a voltage sensor is connected to detect a voltage across terminals of the connector. Also, a controller is connected to control the switch responsively to the voltage sensor such that a voltage indicating a charging voltage applied across the terminals causes the current limiter to be connected between the battery cell and the terminals.

According to still another embodiment, the invention provides a metal-air battery power supply with a metal-air battery cell. The power supply is for connection to a portable device. The portable device has terminals for connecting to a portable power source. An adapter on the portable device is connectable to a battery charger connected through the portable device to the terminals. The power supply has a movable cover on the battery positionable in a blocking position with respect to the adapter to prevent connection of the adapter to the charger. An electrical switch is connected to the movable cover such that when the movable cover is placed in the blocking position, the electrical switch directly connects the battery to the terminals and when the movable cover is in a position other than the blocking position, the electrical switch connects the battery to the terminals through a current limiter. This device is applicable to a cell phone.

According to still another embodiment, the invention provides a metal-air battery power supply with a metal-air battery cell. The power supply is for connection to a portable device. The portable device has terminals for connecting to a portable power source. An adapter on the portable device is connectable to a battery charger connected through the portable device to the terminals. There is a movable cover on the battery is positionable in a blocking position with respect to the adapter to prevent connection of the adapter to the charger. A connecting device is connected to the movable cover such that when the movable cover is placed in the blocking position, the connecting device directly connects the battery to the terminals and when the movable cover is in a position other than the blocking position, the connecting device connects the battery to the terminals through a current limiter.

According to still another embodiment, the invention provides a metal-air battery power supply with a metal-air battery cell. The power supply is for connection to a portable device. The portable device has terminals for connecting to a portable power source. An adapter on the portable device is connectable to a battery charger connected through the portable device to the terminals. A movable cover on the battery positionable in a blocking position with respect to the adapter to prevent connection of the adapter to the charger. An electrical switch is connected to the movable cover such that when the movable cover is placed in the blocking position, the electrical switch directly connects the battery to the terminals and when the movable cover is in a position other than the blocking position, the electrical switch disconnects the battery from the terminals.

According to still another embodiment, the invention provides a metal-air battery power supply with a metal-air battery cell. The power supply is for connection to a portable device. The portable device has terminals for connecting to a portable power source. An adapter on the portable device is connectable to a battery charger connected through the portable device to the terminals. A blocking device on the battery is positionable in a blocking position with respect to the adapter to prevent connection of the adapter to the charger. A connecting device is connected to the blocking device such that when the blocking device is placed in the blocking position, the connecting device directly connects the battery to the terminals and when the movable cover is in a position other than the blocking position, the connecting device disconnects the battery from the terminals.

According to still another embodiment, the invention provides a battery case. The case has a housing and at least two metal-air battery cells inside the housing. The battery cells are supported in adjacent juxtaposition with major planes thereof substantially coinciding. The housing has a plurality of apertures to allow exchange of gases between an inside of the housing and an outside of the housing. The housing has a surface substantially parallel with the major planes and spaced from the major planes by 0.02 mm to 2.0 mm, thereby defining a plenum between the housing and the metal-air battery cells.

According to still another embodiment, the invention provides a battery case. The case has a housing with at least two metal-air battery cells inside the housing. The cells are supported in adjacent juxtaposition. The housing has a plurality of apertures to allow exchange of gases between an inside of the housing and an outside of the housing. The housing has a surface substantially parallel with the major plane of the battery cells and spaced from at least one of the battery cells the major planes by 0.02 mm to 2.0 mm, thereby defining a first plenum between the housing and the metal-air battery cells. The cells are spaced apart by a distance of at least 3 mm such that a second plenum is defined between the battery cells. Preferably, the cells are at least four metal-air battery cells and third and fourth of the four metal-air battery cells are arranged with their respective major surfaces substantially parallel with first and second of the at least four battery cells and spaced apart by 0.5 mm to 10 mm to define a second plenum therebetween. Preferably, also, the second plenum has a substantially constant hydraulic diameter. Preferably, the housing has at least two holes opposite each other across a gap spanned by the metal-air battery cells thereby defining a flow conduit for bulk flow of air. The conduit is characterized by a ratio of hydraulic diameter of flow cross section to flow length between the apertures of at least 0.5 mm.

According to still another embodiment, the invention provides a battery case for metal-air battery cells that expand during a discharge cycle thereof. The case has a housing containing a support structure for supporting metal-air battery cells. The support structure contains a plurality-of projections into which the battery cells are inserted such that the projections secure the battery cells to the support structure. The projections contain recesses for receiving the battery cells. The projections are shaped such that the recesses allow for the battery cells to expand without resulting in a substantial distortion of the support structure. Preferably, the cells are aligned in layers such that the longitudinal axes along the layers defines a plenum between the battery cells.

According to still another embodiment, the invention provides a battery case for metal-air battery cells that expand during a discharge cycle thereof. The case has a housing containing a support structure for supporting metal-air battery cells. The support structure contains a plurality of projections into which the battery cells are inserted such that the projections secure the battery cells to the support structure. The support structure is configured and of such material that the support structure may flex sufficiently to accommodate the expansion without permitting the battery cells to become unsupported thereby.

According to still another embodiment, the invention provides a battery case for metal-air battery cells, the case. The case has a housing containing a support structure for supporting a plurality of metal-air battery cells. The support structure has first and a second support portions, each portion has recesses for receiving a respective one of the battery cells. Each portion is linked by an integral hinge. The first portion and the second portion have integral standoffs positioned to hold the battery cells held in the first portion a specified distance from the battery cells held in the second portion when the first and second portions are arranged in a parallel relationship inside the housing. Preferably, the case includes diffusing elements positioned above the respective battery cells. The recesses define trays into which the respective battery cells fit. The diffusing element is formed of a material such that a gas exchange through the diffusing elements and between the respective battery cells and an outside of the case is permitted. Preferably, the recesses define trays into which the respective battery cells fit, the trays is closed with an absorbent material attached thereto. In this way, the trays are able to hold any spilled substance emerging from the respective battery cells. Also a gas permeable membrane may be attached to the tray, enclosing the respective battery cells to block an intrusion of liquid into, or leakage of liquid from, the battery cells. The integral hinge may provide at least 180 degree angular movement between the longitudinal axes of the first support portion and the second support portion.

According to still another embodiment, the invention provides a battery case for housing at least one metal-air battery cell with air holes on a surface thereof. The case has a case element shaped to have at least one opening on a surface, thereof. The case also has a holder enclosed by the case element and configured to support the metal-air battery cell. A diffusing element is positioned between the battery cell surface with air holes and the case element such that the battery cell surface with air holes is separated from the case element. The diffusing element is formed of a material such that a gas exchange through the diffusing element and between an outside of the case element and the battery cell is permitted. Optionally, the diffusing element contacts the battery cell surface with air holes. The diffusing element may have a thickness greater that 4 mm, the thickness measured between a surface that contacts the battery cell surface with air holes and a surface that contacts the case element surface with the opening(s). The diffusing element may be formed of an absorbent material. The holder may be formed integrally with the case.

According to still another embodiment, the invention provides a battery case for housing at least two metal-air battery cells with air holes on a respective surface, thereof. The case has a case element shaped to have at least one opening. A holder is enclosed by the case element and is configured to support the battery cells. A diffusing element is positioned between the battery cells such that the battery cells are separated from each other. The diffusing element is formed of a material such that a gas exchange through the diffusing element and between an outside of the case element and at least one of the battery cells is permitted. The diffusing element may contact the surface of the at least one of the battery cells. The diffusing element may contact respective surfaces of the battery cells. The holder may be integral to the case element.

According to still another embodiment, the invention provides a battery case for supporting at least one metal-air battery cell to power an electronic device has a defined peak current load. The case has holes and a holder configured to support the cell(s) in a predefined position inside the case. The case is substantially concave along a surface of the case in relation to the battery cell such that a sufficient number of holes remain unobstructed when the case is placed against a flat surface to satisfy the peak current load. The case may be substantially concave in relation to the battery cell along the case's longitudinal axis. The case may be substantially concave in relation to the battery cell along the width of the case.

According to still another embodiment, the invention provides a battery case for supporting at least one metal-air battery cell. The case has a housing containing a support structure for supporting metal-air battery cells. The support structure has a first surface onto which the battery cells are attached. The support structure has a second surface which attaches to the case. The support structure is made of such material that the support structure allows for the battery cells to expand. The support structure may contain punched out holes with substantially the same width and length as the battery cells such that the battery cells are press-fittable into the holes.

According to still another embodiment, the invention provides a battery case for supporting at least one metal-air battery cell to power an electronic device that has a defined peak current load. The case has a holder configured to support the cell(s) in a predefined position inside the case. The case contains a plurality of projections substantially perpendicular to the exterior surface of the case. The projections are positioned on the case such that a sufficient number of holes remain unobstructed when the case is placed against a flat surface to satisfy the peak current load.

According to still another embodiment, the invention provides a battery case for supporting at least one metal-air battery cell. The case has a housing with holes and an internal support structure for holding the cell(s) fittable inside the housing. A liquid impermeable covering is positioned over the housing such that an intrusion of liquid into a space occupied by the cell(s) is prevented.

According to still another embodiment, the invention provides a battery case for supporting at least one metal-air battery cell. The case has a housing with holes and an internal support structure for holding the cell(s) fittable inside the housing. A liquid impermeable covering attached to an interior surface of the housing such that an intrusion of liquid into a space occupied by the cell(s) is prevented.

According to still another embodiment, the invention provides a battery case for supporting at least one metal-air battery cell. The case has a housing with holes and an internal support structure for holding the cell(s) fittable inside the housing. A liquid impermeable covering is positioned over the internal support structure such that an intrusion of liquid into a space occupied by the cell(s) is prevented. At least two layers of the battery cells may be supported within the battery case and a liquid impermeable covering over each of the layers of battery cells such that an intrusion of liquid into a space occupied by the cell(s) is prevented.

According to still another embodiment, the invention provides a battery case for housing at least one metal-air battery cell. A holder is configured to support the cell(s) in a predefined position within the battery case. The battery cells and battery case are configured to define at least one air conduit inside the case. At least one opening in the battery case is in communication with the air conduit. The openings in the battery case permit the transport of oxygen into the battery case at a rate of 0.04–0.5 cc O2 per second. The openings may permit the transport of approximately 0.2 cc O2 per second into the battery case.

According to still another embodiment, the invention provides a battery pack containing at least one metal-air battery cell. The case has a first substantially rectangular case component with a first major surface and contiguous side walls for encompassing a cathode of the cell(s). It also has a second substantially rectangular case component attached to the first tray-like case component with a second major surface and contiguous side walls for encompassing an anode of the cell(s). The first major surface has a plurality of air access openings. The air access openings have a diameter of approximately 0.5 mm.

According to still another embodiment, the invention provides a battery pack contains at least one metal-air battery cell. The pack has a first substantially rectangular case component with a first major surface and contiguous side walls for encompassing a cathode side of the cell(s) and a second substantially rectangular case component attached to the first tray-like case component. The latter has a second major surface and contiguous side walls for encompassing an anode side of the cell(s). The first major surface has a plurality of air access openings. The number of the air access openings insures that the total current produced by the pack is at least 80 percent of a maximum possible current capacity under all conditions. This includes when some holes are blocked by a user's hand, the appliance is placed on a surface, or other normal operating conditions.

According to still another embodiment, the invention provides a battery case for housing at least one metal-air battery cell with a plurality of air access openings. The case has at least one surface with a plurality of openings for permitting diffusion of gases therethrough. The metal-air battery cells have a plurality of air access openings on the gas-exchange wall of the metal-air battery cells. The plurality of openings on the battery case have a combined area of at least twice the combined area of the air access openings on the metal-air battery cells within the battery case.

According to still another embodiment, the invention provides a battery pack. The pack has a housing with apertures permitting gas exchange between an interior and an exterior thereof. Prismatic metal-air electrochemical cells are supported inside the housing and each of the cells has at least one gas-exchange wall coinciding with a major plane of the cell. Each cell also has a back surface opposite the gas-exchange wall. The gas-exchange wall is provided to allow gas exchange between respective interiors and exteriors of the cells. First and second of the cells are arranged with the gas-exchange walls thereof facing in a same direction toward a major surface of the housing such that a first air space is defined. The first air space is bounded by the gas-exchange wall of the first of the cells and the second of the cells. The arrangement is also such that a second air space, bounded by the gas-exchange wall of the second of the cells and the housing is defined. A thickness of the first air space is a minimum of 3 mm, the thickness being a dimension normal to the gas-exchange walls of the first and second of the cells.

According to still another embodiment, the invention provides a battery pack with a housing. The housing has apertures permitting gas exchange between an interior and an exterior of the housing. Prismatic metal-air electrochemical cells are supported inside the housing, each of the cells has at least one gas-exchange wall coinciding with a major plane thereof. There is also a back surface opposite the gas-exchange wall. The gas-exchange wall is such that gas exchange between respective interiors and exteriors of the cells may occur. First and second of the cells are arranged with the gas-exchange walls thereof facing in a same direction toward a major surface of the housing. This arrangement defines a first air space, bounded by the gas-exchange wall of the first of the cells and the second of the cells. The arrangement is such that a second air space, bounded by the gas-exchange wall of the second of the cells and the housing, is also defined. A thickness of the second air space is a minimum of 0.5 mm, the thickness being a dimension normal to the gas-exchange walls of the first and second of the cells.

According to still another embodiment, the invention provides a battery pack with a housing. The housing is constructed to permit an exchange of gases between the interior and the exterior. At least one electrochemical cell is held inside the housing. The one electrochemical cell has a respective gas-exchange wall through which gas is exchanged between an interior and exterior of the cell(s), the gas-exchange wall coinciding with a major plane of the at least one electrochemical cell. The electrochemical cell is located inside the housing such as to define an air space with a clearance equal to a minimum dimension in a direction substantially normal to the electrochemical cell gas-exchange wall. The holder and the housing are further configured such that a distance between a portion of the cell(s) gas-exchange wall that is most remote from a closest portion of the housing through which gas exchange between the interior and exterior of the housing, the closest portion being no greater than twenty times the overhead clearance. That is, the distance of this portion to the closest part of the housing where gas exchange occurs is no more than 20 times the overhead clearance.

According to still another embodiment, the invention provides a battery pack, with a housing. The housing has openings in a wall thereof to permit an exchange of gases between an inside of the housing and an outside of the housing. The pack has at least one electrochemical cell with holes in at least one major surface of a case thereof. The major surface(s) faces the wall. A spacing of the openings and a spacing of the holes together with a position of the at least one electrochemical cell are such that the holes and the openings are substantially aligned. Preferably, the openings are shaped such that their cross-sectional area decreases, either step-wise or progressively, in a respective axial direction from an interior surface of the housing toward an exterior surface of the housing.

According to still another embodiment, the invention provides a package for encasing an electrochemical device requiring an ambient gas. The package has an enclosure capable of encasing the electrochemical device. The enclosure is at least partly formed of a material that permits diffusion of the ambient gas into and out of the enclosure. Preferably, the enclosure has a moisture permeability of less than 3 mg $H2O$/day/300 $cm^2$. The enclosure has an enclosing element and at least one sheet, the enclosing element having at least one opening. The sheet(s) cover the opening (s) and is attached to the enclosing element. The sheet may be formed from a material that permits diffusion of the ambient gas. The size of the opening(s) and a material of the at least one sheet may be such that the enclosure has a moisture permeability of less than 3 mg $H2O$/day/300 $cm^2$. The enclosing element has a moisture permeability of less than 0.5 mg $H2O$/day/300 $cm^2$.

The invention will be described in connection with certain preferred embodiments, with reference to the following illustrative figures so that it may be more fully understood.

With reference to the figures, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

BRIEF DESCRIPTION OF THE DRAWINGS

FIG. 48 and FIG. 48A is a schematic diagram of a current limiting circuit.

DETAILED DESCRIPTION OF THE PREFERRED EMBODIMENT

Figure 1:
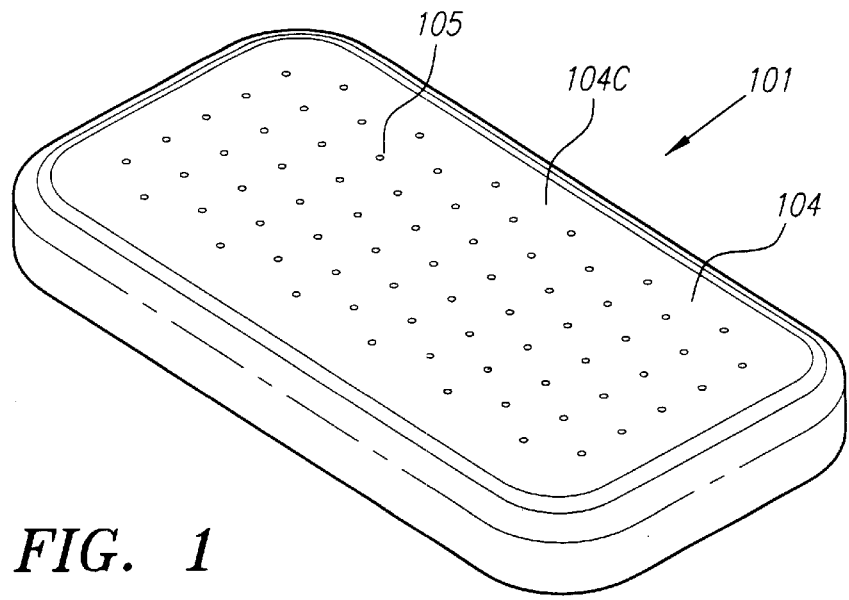
FIG. 1 is a perspective view of a prismatic metal-air battery cell.
Figure 2A:
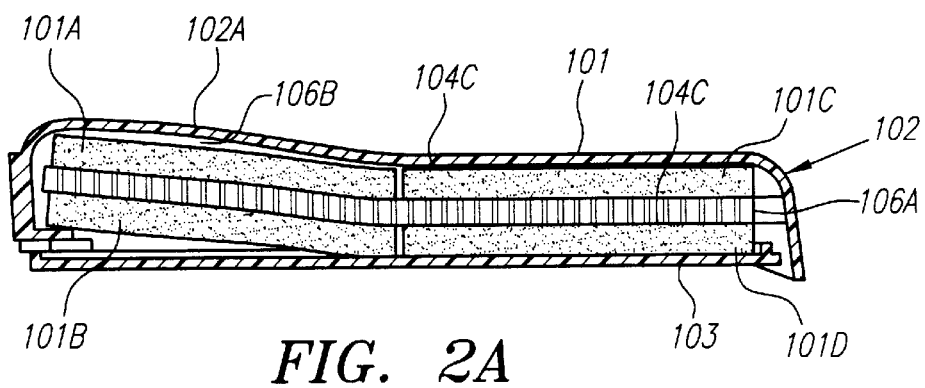
FIG. 2A is a cross-sectional view of the battery pack shown in FIG. 3.
Figure 2B:
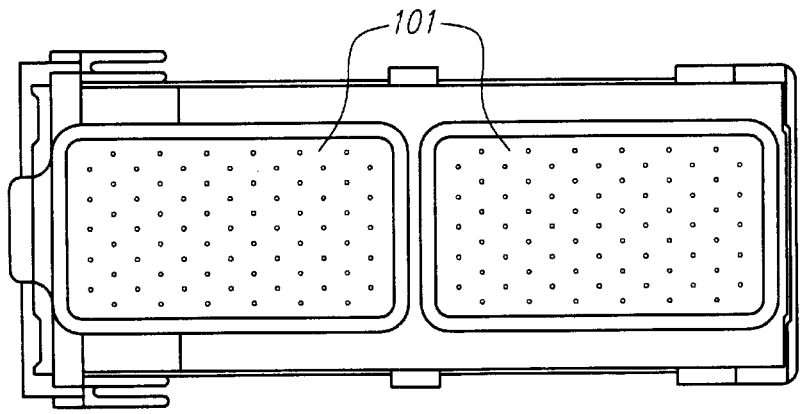
FIG. 2B is a top view of battery cells attached to the base of a battery pack.
Figure 3:
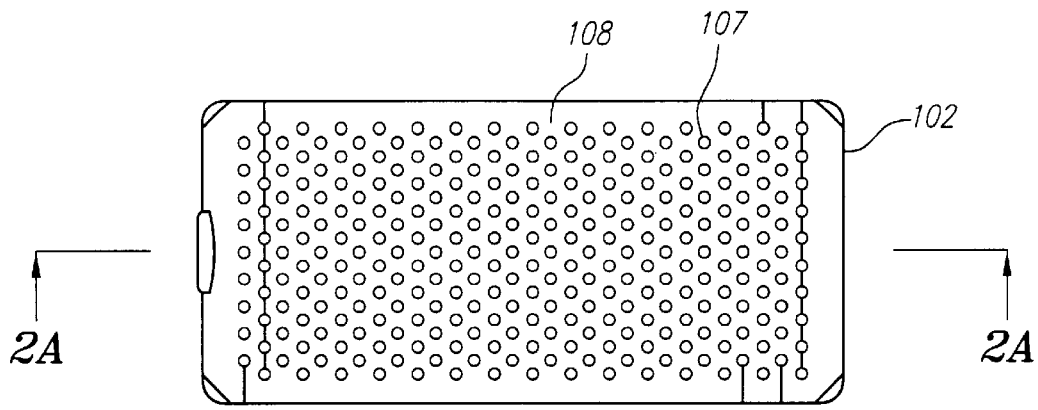
FIG. 3 is a top view of a battery pack.
Figure 4:
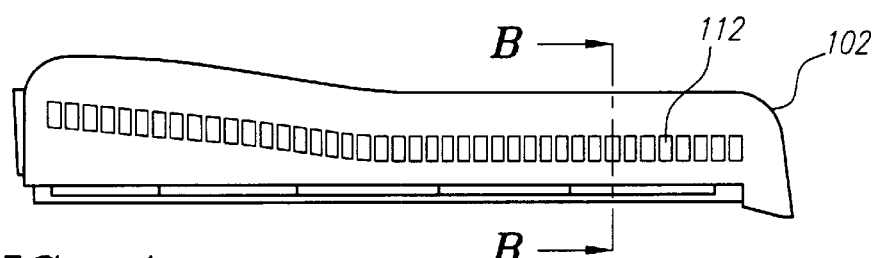
FIG. 4 is a side view of a battery pack.

Referring now to the drawings, as shown in FIGS. 1 and 2A, a battery pack has a plurality of prismatic metal-air battery cells 101, for example zinc-air battery cells.

As shown in FIGS. 2A through 5A, the battery pack has a battery pack case 102, with a base 103, which encloses metal-air battery cells 101. Each metal-air battery cell 101 may be, and preferably is, a prismatic metal-air battery cell as shown in FIG. 1 to permit high packing density.

In an embodiment, each metal-air battery cell 101 is box-shaped with rounded corners. The rectangular shape permits high packing density where an array of battery cells is required to achieve desired current and voltage. The battery cell case 104 holds the various elements of an electrochemical battery cell. The battery cell 101 has an outer case wall 104 that may be of plastic or metal. The outer case wall 104 is supplied with air access holes 105 to allow oxygen to enter the battery cell 101. The battery cell 101 may absorb oxygen on one of its major planar surfaces, the gas-exchange wall 104C, and that side alone would then be supplied with holes. Other battery cell designs which absorb oxygen through both sides are also possible (herein after referred to as "bicells").

In general, oxygen access holes 105 must allow sufficient oxygen to reach the air cathode to satisfy the electrochemical requirements of the battery cell 101 in the given application. If the holes 105 are too large or plentiful, excessive amounts of moisture will be lost from the battery cell 101 shortening the standby or shelf life of the battery cell 101. If the holes 105 are too sparse, the battery cell 101 may not satisfy the load.

A typical analog cellular phone, when in "talk" mode, may draw between 400–700 mA of current, depending in part on the distance between the phone and the transmitting antenna and the surrounding atmospheric conditions. Likewise, a typical digital cellular phone may draw between 200–450 mA of current. As depicted in FIG. 2A, one battery pack configuration contains four zinc-air battery cells 101. These battery cells 101 require oxygen at the rate of 0.15 cc/sec to generate 600 mA of current and 0.05 cc/sec of oxygen to generate 200 mA of current.

To ensure adequate oxygen delivery to the air cathode of the metal-air battery cell 101, air access holes 105 are distributed across the case wall 104 of the gas-exchange wall 104C of the battery cell 101. The air access holes 105 on the gas-exchange wall 104C of each metal-air battery cell 101 are sized and populated to ensure that the cathode, under high current load, is not starved for oxygen, which would result in a drop in voltage. In addition to insuring an adequate supply of oxygen to the cathode, the number and spacing of the holes 105 are also designed to minimize excessive moisture loss.

As discussed above, a difference in partial pressure of oxygen across the air access holes 105 forces air to diffuse through the air access holes 105. A difference in partial pressure of oxygen across the air access holes 105 results from the depletion of oxygen inside the battery cell 101 when the oxygen is converted to hydroxyl ions. This generates a gradient that causes oxygen to diffuse into the battery cell case 104.

The density of the holes 105 may be optimized by bringing a limited number of holes 105, say two, closer and closer from a remote separation until the total current generated by the metal-air battery cell 101 starts to drop off significantly. This indicates the point where the area supplied by the air access holes 105 begins to overlap significantly. A more dense spacing simply provides area for evaporation without contributing substantially to oxygen supply to the cathode.

A zinc-air battery cell 101 with an area of approximately 2.5 cm×4.5 cm and a thickness of 0.5 cm has been determined to be a flexible size for a variety of practical battery pack sizes and shapes, which provides a suitable power for a large range of cellular phones and other electronic devices. For ease of manufacturing, it has been found desirable to employ holes 105 of around 0.4 to 0.5 mm in diameter because such holes 105 can be punched conveniently (without high rates of wear of the punching tool) in battery cells 101 of 0.1–0.4 mm case wall 104 thickness and provide good air access while, at the same time, limiting moisture loss. A zinc-air battery cell 101 with an area of approximately 2.5 cm×4.5 cm should have approximately 70 such holes 105 on the gas-exchange wall 104C of the battery cell 101.

Each metal-air battery cell 101 under substantial current load and/or after a degree of discharge may provide between 0.9 and 1.2 volts. In a preferred embodiment for a cellular phone requiring an operating voltage of 3.6 volts, four zinc-air battery cells 101 are provided in the battery pack and have a combined air-electrode surface area of about 30–60 cm$^2$. The air access openings in the case wall on the gas-exchange wall of the metal-air battery cells have a total area of at least 0.2 cm$^2$, preferably at least 0.5 cm$^2$.

Referring to FIGS. 2A through 5A, a subassembly, with a plurality of metal-air battery cells 101, is arranged in a plastic battery pack case 102. A number of metal-air battery cells 101 are connected in series to obtain the desired voltage, energy capacity and power required for the product. To adequately supply oxygen to the metal-air battery cells 101, and thus to the air cathode within the metal-air battery cells 101, the battery cells 101 are supported within the battery pack case 102 in such a way as to ensure that air can get through the battery pack case 102 and reach the battery cells 101.

The metal-air battery cells 101 are placed in the battery pack case 102 and form contiguous internal spaces or plenums 106A and 106B in communication with ambient air. The case 102 is liberally supplied with openings 107. The openings 107 permit an exchange of gases between the battery cells 101 and the ambient air. Various gases must be exchanged to maintain operability of the battery cells 101, principally, oxygen, which must be continuously delivered to the battery cells 101. The air openings 107 may be sized and located on the case 102 as desired as long as their size and placement permit sufficient gas exchange to allow the cells to operate. As discussed in the instant specification, gas exchange can be provided by either bulk air flow or gas diffusion through the case 102 walls or a combination of the two. The air access openings 107 can be circular, elliptical, rectangular or any combination of shapes.

Bulk air flow depends on the specific environment of the battery pack. Flow may be driven by local pressure gradients induced by local heating of an attached electronic device or the battery cells 101 themselves. Bulk flow may also be driven by movement of the case 102 or by movement of ambient air outside the case 102. Gas exchange may also occur, in the absence of bulk flow, by diffusion resulting from differences in the partial pressure of the respective gases between the outside of the case 102 and the battery cell's 101 gas-exchange wall(s) 104C. In the case of the battery cell embodiment of FIG. 1, the gas-exchange wall 104C is the portion of the battery cell case wall 104 with holes 105.

Alternatively, porous plastic or semipermeable membranes or materials, which allow sufficient gas exchange can be used in place of openings 107 in the battery pack case 102. These semipermeable membranes or materials can be used as an alternative in the embodiments described in this application.

Referring now specifically to FIGS. 2A–5A, battery cells 101A–101D are arranged in two layers to define a plenum 106A between the two layers. The battery cells 101A and 101C in the top layer are oriented with their holes 105 facing the top outside surface of the case 102. The battery cells 101B and 101D in the lower layer are oriented in the same direction so their holes 105 face the plenum 106A. Slots 112 allow bulk flow of air and diffusion of gases through the plenum 106A. The holes 105 of battery cells 101A and 101C in the top layer communicate with the outside air almost directly through openings 107 in the top portion 102A of the case 102. There is a small plenum 106B defined by a spacing between the top portion 102A of the case. This prevents holes 105 in the top layer of battery cells from being smothered by the top portion 102A of the case 102. That is, not all holes 105 in the top layer battery cells 101A and 101C, coincide with openings 107. Thus, some of these openings would not communicate with the outside air if not for the presence of a gap defining the plenum 106B. Of course, it may be possible to avoid the requirement of a plenum such as 106B if the cell holes 105 are aligned with the case openings 107.

Figure 5A:
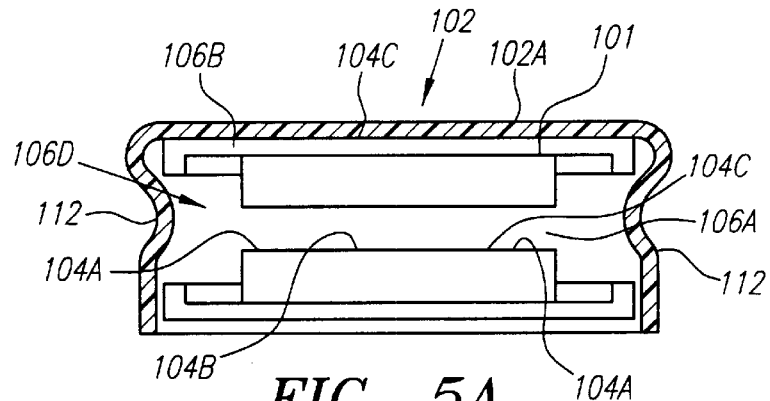
FIG. 5A is a cross-sectional view of the battery pack shown in FIG. 4.

Referring to FIG. 5A, the sizes of plenums 106A and 106B differ for the following reason. There is a relatively long distance between at least some of the holes 105 in the battery cells 101B and 101D making up the lower layer and the closest openings 112 in the sides of the case 102. If, for example, the battery cells 101 are 2.5 cm in width, the minimum distance between the middle of the cells 104B and the nearest opening 112 in the case 102 is at least 1.25 cm (Note, however, in the embodiment of FIG. 5A, there is a substantial additional distance added by the space 106D). There is a tendency for the exchange of gases between the outside of the case 102 and the outer portions 104A of the battery cells 101B and 101D to draw the partial pressure of gases immediately above the battery cells 101B and 101D to levels close to those of the interior of the battery cells 101B and 101D. If this is permitted to happen, the gradient between those outer portions 104A and the middle portions 104B can be extremely low. Such low gradients are inconsistent with high current operation, which is desired. The overhead clearance of the plenum 106A and the proximity of openings 112 to the cell surfaces through which gas exchange occurs ensure that such a stifling effect is avoided.

Also, the height of the plenum 106A and the size and abundance of openings 112 in communication with the plenum 106A is such as to permit bulk flow of air into the plenum 106A with very little driving force. Mild ambient pressure fluctuations and slight temperature differences between the inside of the battery pack and the outside air are sufficient to cause bulk transfer of air where the plenum is characterized by low flow resistance.

Figure 5B:
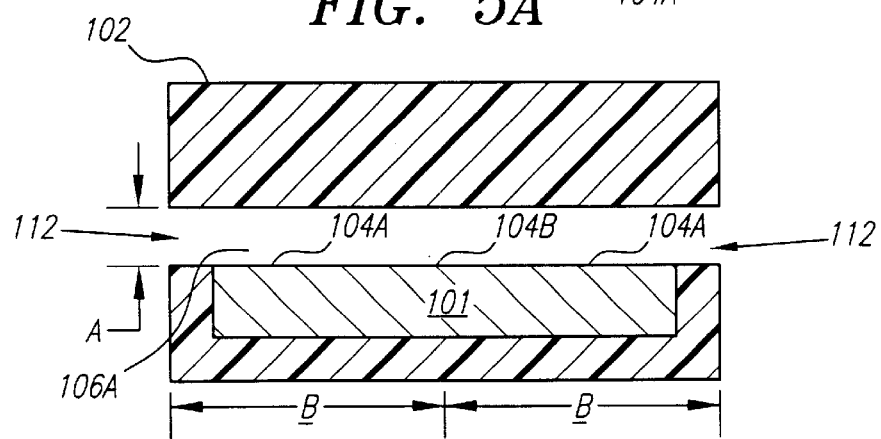
FIG. 5B is a simplified drawing of a cross section of an idealized battery pack configuration showing an internal plenum design that is conducive to ready bulk air flow.

Referring to FIG. 5B, adequately low flow resistance and adequately high diffusion and bulk flow rates can be ensured by one or some combination of the following features:

1. In each cell pack configuration, there is a portion of the cell(s)' gas-exchange wall that is most remote from an opening in the case. There may be more than one such portion. The term gas-exchange wall is used to refer to any part of the cell through which gas exchange takes place. In cells that employ holes in their cases to admit oxygen, for example, the gas-exchange wall portion identified above is a hole in the cell case. The ratio of the distance between this gas-exchange wall portion and the pack case opening that is closest to it to the overhead clearance, should be no more than twenty. The overhead clearance is simply the distance in a direction normal to the cell gas-exchange wall to the opposite face of the conduit. Referring to FIG. 5B, the minimum ratio of overhead clearance (dimension A) to distance between the portions of a battery cell 104B most remote from an opening to the nearest opening 112 (dimension B) is about 1/20. This restriction would apply where the most remote portion is a non-trivial percentage of the gas-exchange wall.
2. There is another ratio equal to the square of the hydraulic diameter to the length of an air path, through the conduit, the path of the conduit including opposing openings 112 and the plenum 106A. This ratio should be at least 0.5 mm. For conduits that are very flat, which better approximate a flow path between parallel plates, the ratio that should be used is the square of the minimum dimension of the conduit to the length. The minimum for this latter ratio is about 0.15. These ratios concerns bulk flow of air and therefore pertains to plenums with large spacing and free flow of air. Therefore this ratio can't be meaningfully applied to "conduits" that are very small. Generally, but not necessarily always, this ratio permits the design of cases where cell gas-exchange walls are hidden fairly deeply within the case.
3. A substantially unvarying cross-section to the conduit identified above. This is a bulk flow criterion also.
4. A relatively straight flow path defined by the internal plenum space. This is also a bulk flow criterion. Both 3 and 4 would generally not apply where diffusion clearly dominates, such as in embodiments where cell gas-exchange walls are directly adjacent the walls of the case.
5. There is a minimum ratio of the aperture size through which gas is exchanged with the cell(s) to the peak power generated by the cells supplied with oxygen through that aperture. Where a cell is housed in a pack defining a parallelepiped-shaped plenum open on all four sides (excluding the cell gas-exchange wall and the face opposite thereto) with no case obstruction, the aperture is the perimeter of the plenum multiplied by the thickness of the plenum (as in FIG. SB). That is, in this example, gas exchange occurs through all four sides of the plenum. This minimum ratio has been determined to be about 300 mm$^2$/watt of peak power capacity. This criterion basically applies where diffusion is the dominant gas exchange mechanism. Where bulk flow becomes applicable (e.g., in a sufficiently large diameter conduit), this criterion becomes less important.
6. Large area of openings 112. Preferably, to allow for bulk flow of air, the openings should have hydraulic diameters of at least 3 mm and even more preferably as large as practical.
7. Internal plenum 106A is open at opposite ends to allow for natural convection or cross-flow ventilation. This is a bulk flow criterion.
8. Case openings 107 and/or 112 should be designed to prevent oxygen starvation of battery cells 101 when the battery case is placed against an obstruction.

Diffusion may be the limiting driving force for gas exchange into and out of the plenum when the plenum size is very narrow. But bulk flow figures prominently as the size of the plenum increases. Where diffusion dominates, the oxygen demand satisfiable by the plenum scales with the net area of the aperture through which gas exchange takes place into and out of the plenum. The net area of the aperture is the area of holes in the case supplying the plenum or the perimeter multiplied by the plenum width (for uniform plenums), whichever is larger. (That is if the net area of the case holes is larger than the aperture of the plenum, then the aperture with which we are concerned is the aperture of the plenum itself.)

The first guideline above helps to ensure adequate diffusion by preventing choking of the diffusion path by the outer portion 104A of the gas-exchange wall 104C. In other words, the portion of the battery cell 101 that is close to the opening 112 may draw down the partial pressure of oxygen in that portion of the plenum 106A that is close to the case openings 112 toward the values obtaining inside the battery cells 101. For a two-dimensional model of this situation such as represented by FIG. 5B, and to a first approximation, the ratio of the height of the plenum A to the distance to the most remote portion of the gas uptake surface B is invariant with the rate per unit area of diffusion across the gas uptake surface. Again, this approximation is based on a two-dimensional model of diffusion corresponding to the cross-section shown in FIG. 5B and on a pure diffusion situation with no bulk flow. It has been found that, for battery cells 101 with the high current density requirements of digital cellular phones, in a battery pack with the gas-exchange wall 104C of battery cells 101 facing an internal plenum 106A, that the value of B to A should not be substantially higher than about 20. For applications with lower power requirements, this ratio can be increased. It should be noted that in configurations where as exchange is driven purely by diffusion or diffusion is deemed adequate, the presence of a diffuser material, such as the type used to provide spacing in zinc-air battery cells, may be present in the plenum without ill effect.

The second guideline refers to a factor that is important under conditions where bulk flow is possible. It has been found that, in nearly all of the embodiments described herein, the bulk flow of air contributes, at least partially, to the operation of the battery packs. Those battery cells 101 inside the battery pack, which do not lie immediately adjacent openings 107 in the case 102, benefit from bulk flow of air into the case 102. The lowest friction for an otherwise smooth duct is obtained with a duct having the largest hydraulic diameter. Flow resistance in laminar flow channels, to a first approximation, is linearly proportional to the duct length and inversely proportional to the square of the hydraulic diameter. In the case of a cellular phone battery pack, with its size and current limitations, sufficient bulk flow can be obtained with a plenum having a ratio of hydraulic diameter squared to length of 0.5 mm or more.

Figure 5C:
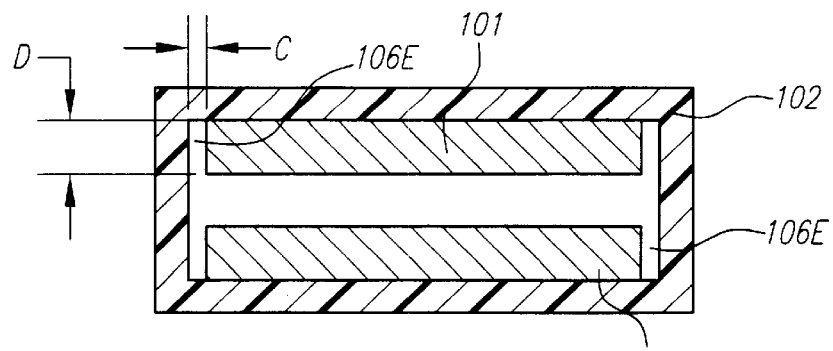
FIG. 5C is a simplified drawing of a cross section of a battery pack configuration showing an internal plenum design that contains stagnant air space.
Figure 5D:
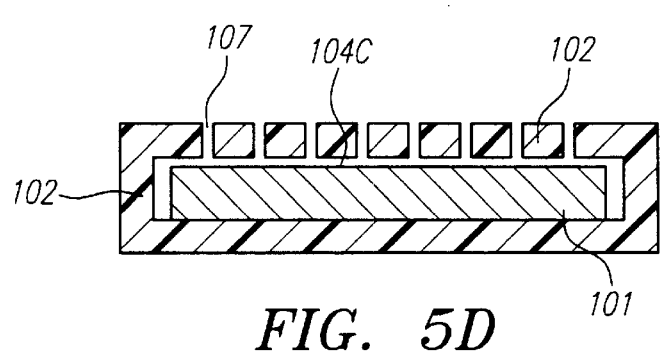
FIG. 5D is a simplified drawing of a cross section of an idealized battery pack configuration showing a design where the battery cell air access openings are aligned with the openings in the battery pack case.

As shown in FIG. 5C, stagnant space 106E (of which many sizes may exist in different embodiments of this invention) may be defined by the battery cell 101 and the battery pack case 102. This stagnant space 106E does not contribute substantially to the flow resistance. As such, as shown in FIG. 5C, the wetted surface area for determining the hydraulic diameter is approximated by discarding the effect of the stagnant space 106E. However, if the exposed length of the stagnant space 106E, represented by dimension C, increases to account for a significant portion of the cross section, the accuracy of the approximation decreases.

Generalization to other battery pack designs is difficult, because the length and shape of the plenum factor into the overall flow resistance. In the size range of cellular phone battery packs with their different inherent current requirements, the above-stated threshold value is a good design point. However, these two factors, resistance to bulk flow and resistance to diffusion, corresponding to guidelines 1 and 2, provide two independent requirements. Depending on the application, the satisfaction of one of these requirements may necessarily satisfy the other.

As it turns out, under the conditions of high current applications, bulk flow into the plenum 106A may be necessary in designs with relatively reduced plenum spacing. That is, if a compact configuration is desired, the balance point for applications such as cellular phones dictates that if the plenum 106A is designed to permit substantial bulk airflow through it, the overall size of the plenum 106A can be minimized. For low current applications, or configurations with inherently low ratios of A to B (narrow plenum), the smallest form factor may coincide with a pure diffusion based design with low overhead clearance.

It has been found, when the battery packs are used in cell phone applications and drained in the context of normal use of the appliance, that the oxygen demand satisfiable by the plenum does not follow the expected linear relationship. For example, for a design to power a device having a current demand of about 600 mA continuous, three cells of approximately 2.5×4.5 cm in size and facing a plenum would require a minimum plenum width of 3 mm. But if two layers of such cells face the same plenum, thereby doubling the oxygen demand, the plenum width only needs to be increased to about 4 mm. The non-linearity of the relationship between oxygen demand and aperture results from the increasingly important role played by bulk air flow through the plenum as the plenum hydraulic diameter is increased. As expressed in the second criterion above, bulk air flow resistance goes approximately as the ratio of the length of the plenum from one aperture to an opposing aperture to the square of the hydraulic diameter of the cross-section of the plenum. So the increasing width of the plenum is attended by a geometric decrease in the resistance of the plenum to bulk air flow. It has been discovered from experience in using battery packs under normal conditions that the bulk flow may contribute significantly gas exchange and that bulk flow may be driven by thermal convection, transient air flow, and/or density effects resulting from differences in the concentrations of the different gases inside and outside the casing. From a theoretical standpoint, it is hard to calculate for the real-world situations of use, the relative significance of bulk flow (convection) and diffusion of gases because there are so many parameters involved. The angle at which the appliance is held, how warm the appliance is relative to the outside air, the effect of movement by the user, the heat form a person's body, etc. From practical experience with cellular phones and other small portable appliances with similar power requirements, threshold design points (characterized in terms of a characteristic length, either hydraulic diameter or plenum width) where the convection effects become significant, has been found. This point is defined in criterion number 2 explained above and below. It turns out that these design points coincide well with a value predicted based on Grashof number which is a ratio of the relative importance to gas exchange due to convection relative to diffusion is given by:

$$Gr = \frac{g\beta \Delta T L^3}{v}$$

where g is the gravitational acceleration constant, β is the coefficient of expansion of the gas, ΔT is the temperature difference between the wall of the cells and the outside air temperature, L is a characteristic length of the flow system which in the case of a narrow plenum is its thickness, and v is the kinematic viscosity. The temperature and temperature difference used were room temperature and 3C and the length varied to find the value that coincided with the transition above and below GR=1000. This value was about 2.2 mm which is about the value obtained through practical experience. Below this point, diffusion is overwhelmingly the dominant gas transport mechanism. Above this point, bulk flow contributes. The conclusion is that a decided advantage, where a cells are buried inside a cell pack, is obtained when the plenum feeding those interior cells has a minimum dimension of approximately 2.5 (2.5 came from practical experiment and 2.2 from the Gr calculation) so that bulk flow contributes substantially to gas transport into the cell pack.

Guidelines 3, 4, and 6 help to ensure that bulk flow is not unduly restricted. With regard to guideline 3, a channel that does not require fluid passing through it to be accelerated is characterized by a lower pressure drop than one that does. So contractions and expansions of the flow area will increase resistance to bulk flow. With regard to guideline 4, a straight flow path requires no bulk acceleration and is, therefore, less restrictive than one that is not straight. With regard to guideline 6, large openings 112 connecting the outside ambient air with the interior of the plenum 106A (or flow passage) may help to ensure lower pressure drop. Ideally, the openings can be shaped using appropriate fluid-mechanical design techniques.

Guideline 5 helps ensure that the gradient that drives the diffusion of oxygen is not choked off near the opening 112, thereby ensuring an efficient diffusion near the gas-exchange wall portions 104B that are remote from the opening 112. This guideline helps to ensure that, in configurations susceptible to a two-dimensional approximation, the cross-sectional area of the opening is large relative to the perimeter coinciding with the area through which gas is exchanged. The statement of guideline 5, however, applies to configurations that aren't susceptible to a two-dimensional approximation. Note that this guideline may be a necessary condition, but it is certainly not a sufficient condition for high current operation since a minimum spacing is required to avoid throttling the diffusion rate at points remote from the case openings.

A total aperture size of approximately 300 mm² for every 1 watt of power demanded is a guideline for designing a case and/or an arrangement of cells with sufficient oxygen access. The total aperture size is the minimum area (e.g., of the openings in the case) through which oxygen access to the gas-exchange walls is provided.

Guideline 7 helps to ensure that bulk flow can take place. Flow induced by ambient air movement and natural convection induced by heating of the battery pack can occur much more readily if air can move out of the battery pack in the same direction as air trying to move into the pack. With this criterion satisfied, the plenum can act most like a conduit or a stack (for thermal convection).

With respect to guideline number 8, and referring to FIGS. 2A–5A, when the holes 105 in the battery cells 101 are aligned with the openings 107 in the battery pack case 102, the potential obstruction of the holes 107 in the battery pack case 102 should be a design consideration. The preferred technique is to determine experimentally the locations of air access holes 107 to be placed on the battery pack case 102 that can be covered by the hand of an average cellular phone user. This indicates the number and locations of holes 107 that may become blocked. The remaining holes 107 must then be sized and placed to provide a sufficient flow or diffusion of air to prevent oxygen starvation of the metal-air battery cells 101.

By assuming that the entire major surface of the battery pack case 102, or any of the battery pack case's side surfaces, may be blocked due to its placement on a flat surface, the locations of air access holes 107 and/or 112 that must be placed on the sides of the battery pack case 102 or on the major surface of the battery pack case 102 can be determined.

Some common observations to aid in the placement of the air access holes 107 and/or 112 include: (1) no more than 50% of the side surfaces of the battery pack case are typically blocked by the user during operation of a cellular phone; (2) no more than 50% of the major surface of the battery pack case is blocked during operation of a cellular phone; and (3) when a battery cell's air access holes 105 face, and lie, directly against the air access holes 107 in the battery pack case, the air access holes 107 in the battery pack case 102 that feed this battery cell should be prevented from being blocked as much as possible. One way to ensure this is to put a plenum interior to the case or standoffs (as described below) on the outside of the case 102.

Figure 6A:
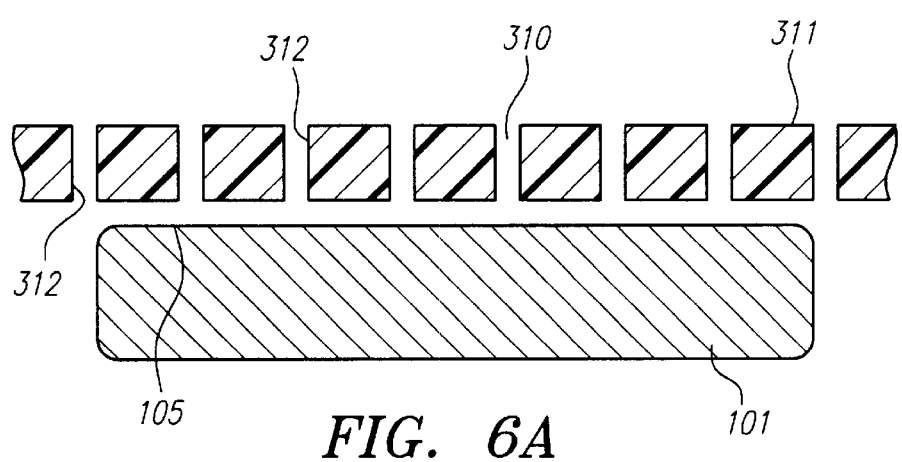
FIG. 6A is a cross-sectional view of an air access opening in a battery pack case.
Figure 6B:
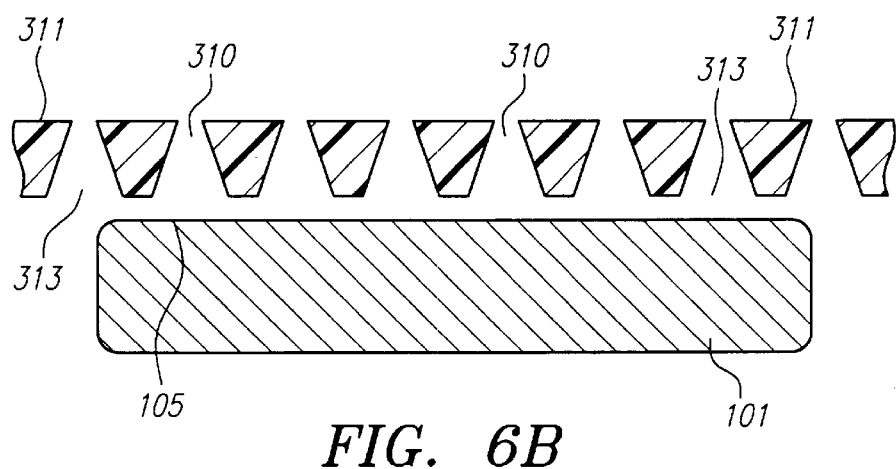
FIG. 6B is a cross-sectional view of an air access opening in a battery pack case.
Figure 6C:
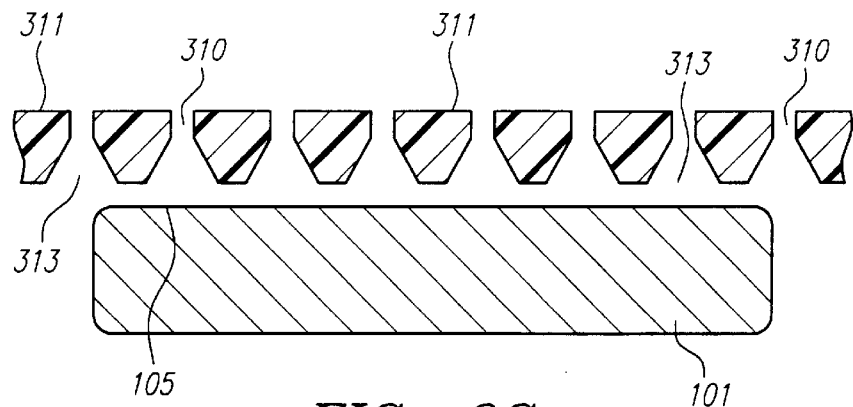
FIG. 6C is a cross-sectional view of an air access opening in a battery pack case.

As shown in FIG. 6A, the air access openings 310 in the battery pack case 311 have a uniform cross-section 312. Alternatively, and preferably, the cross-sections can be non-uniform so that the cross-sectional area expands toward the inside of the case 311. FIGS. 6B and 6C show a couple of examples. Such non-uniform openings 310 help to increase the diffusion of air gases (oxygen) to and from the air access holes 105 of the individual battery cells 101 by reducing the diffusion path length to these battery cells and helping to prevent any of the battery cell holes 105 from being covered by a solid portion of the case 102. As can be seen in FIGS. 6B & 6C, the base 313 of the air access openings 310 in the battery pack case 311 can substantially overlap the air access openings 105 in the battery cells 101 without blocking holes 105.

Figure 7:
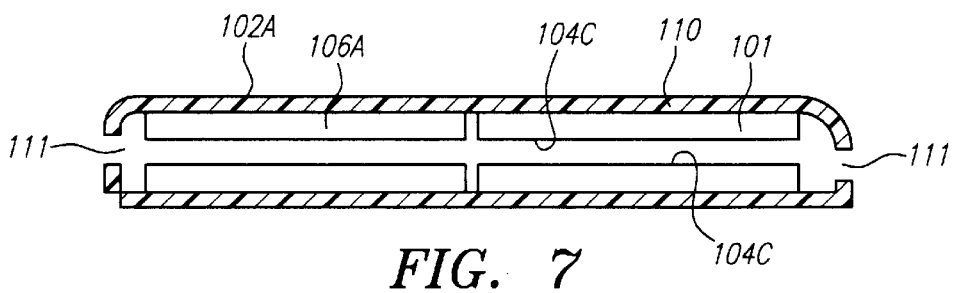
FIG. 7 is a cross-sectional view of a battery pack with air access holes at the longitudinal ends of the battery pack.
Figure 8:
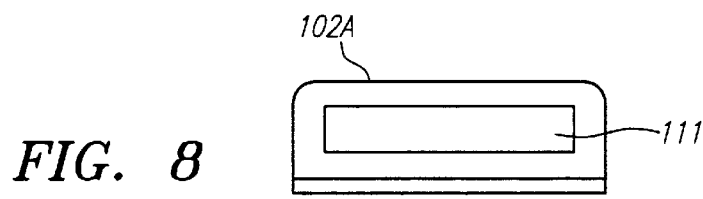
FIG. 8 is a side view of a battery pack with air access holes at the longitudinal ends of the battery pack.
Figure 9A:
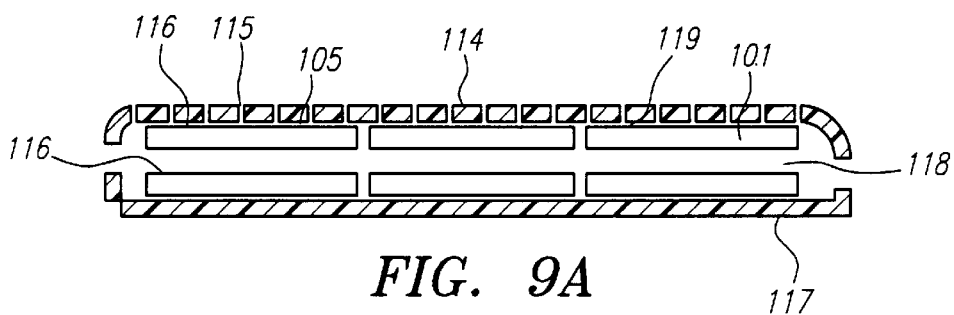
FIG. 9A is a cross-sectional view of the battery pack shown in FIG. 11 where the section is taken through the long axis.
Figure 9B:
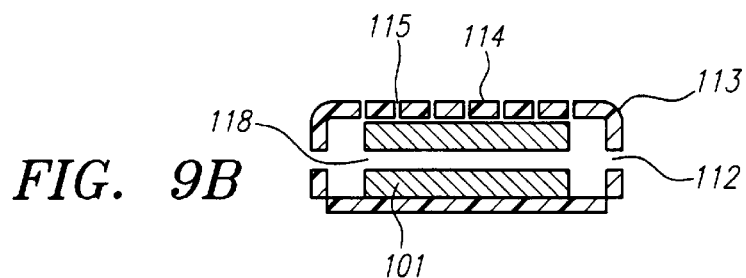
FIG. 9B is a cross-sectional view of the battery pack shown in FIG. 11 where the section is taken through the short axis.

Referring now to FIGS. 7 and 8, a particular embodiment designed along the lines of the idealized configuration of FIG. 5B, has openings 111 located at opposite longitudinal ends of the battery pack case 110. The opposing openings 111 are joined by a conduit or plenum 106A to permit cross-flow ventilation through the battery pack case 110. The depth (smallest dimension) of the conduit 106A and openings 111 are at least 3 mm when no active air management is used. The openings 111 may be shaped as a slot, many vertical slots, as round or rectangular holes, or any other shape that allows a sufficient open area for air flow. The battery cells 101 have a single gas-exchange wall 104C and are oriented so that their gas-exchange walls 104C face the plenum 106A. This allows the battery cells 101 to be directly attached to the case 110, for example, by adhesives or a snap-fit engagement device molded into the case 110. In this embodiment, the top side of the case 102A would not require any openings as in the embodiment of FIGS. 2A–5A.

Figure 10:
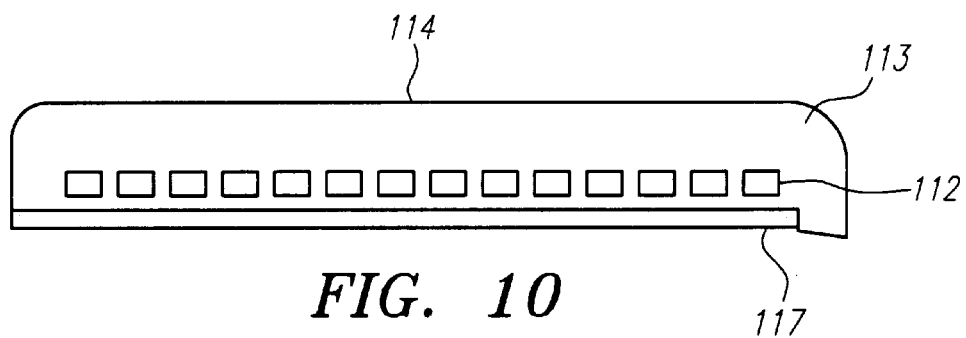
FIG. 10 is a side view of a battery pack.
Figure 11:
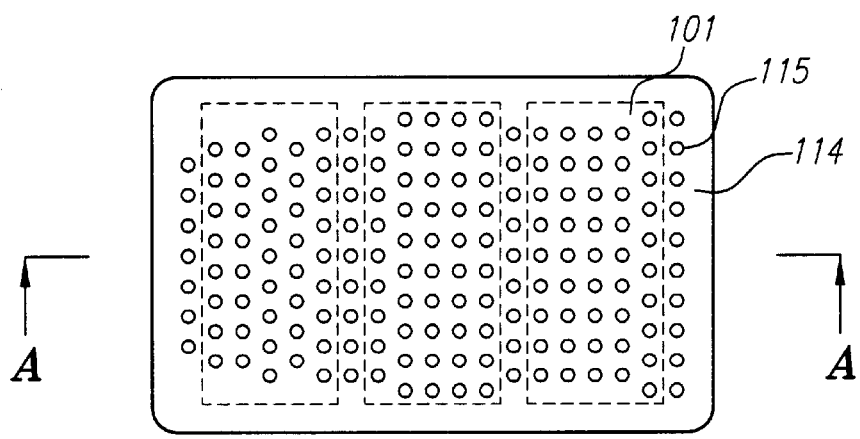
FIG. 11 is a top view of a battery pack.

Referring to FIGS. 9A, 9B, 10 and 11, an embodiment has six battery cells 101. The battery pack case 113 has a (top) major surface 114 with air access holes 115. The gas-exchange wall 116 of each metal-air battery cell 101 faces away from the base 117 of the battery pack and toward the major surface 114 of the battery pack case 113. The air access holes 105 of all the metal-air battery cells 101 face in the same direction forming two parallel layers defining a plenum 118 between them. A base 117 attaches to the battery pack case 113 enclosing the metal-air battery cells 101. When a plenum such as plenum 118 is used, it is helpful to provide air access-holes 112 on the side or the entire periphery such as shown in FIG. 10.

Another plenum 119 is defined between the topmost layer of battery cells 101 and the outermost layer of the major surface 114 of the battery pack case 113. This configuration is similar to that shown in the example of FIGS. 2A–5A.

As previously discussed, the diffusion of oxygen to the battery cells 101 is a function of the partial pressure of oxygen and the required distance that the oxygen must travel. The topmost battery cells are in close contact with the major surface 114 of the battery pack case 113 and oxygen from ambient air has a short diffusion path to supply oxygen to these battery cells 101. Considering that the rate of diffusion is inversely proportional to the path length (for constant partial-pressure boundary conditions), the short distance between the holes 105 in the battery cells 101 and openings 115 in the case 113, the upper plenum 119 may be very small; on the order of a millimeter or less. It has been found that a minimum for this plenum 119 thickness can be approximately specified as a fraction of the maximum separation distance between an air access hole 105 on the battery cell and the closest case opening 115. The separation distance should be no more than 20 times the thickness of the plenum 119.

For example, a thickness of 0.05 mm is sufficient if the distance between respective opening 115 and hole 105 is not much more than approximately 1.0 mm. To obtain such very tight clearances, a diffuser may be placed between the top layer of battery cells 101 and the top of the case 114. In reference to the plenum 118 between the two layers of battery cells 101, if half the width of the case 113 is about 30 mm, the plenum 118 should be at least approximately 1.5 mm thick, following the above design criteria (the first listed guideline).

Figure 12A:
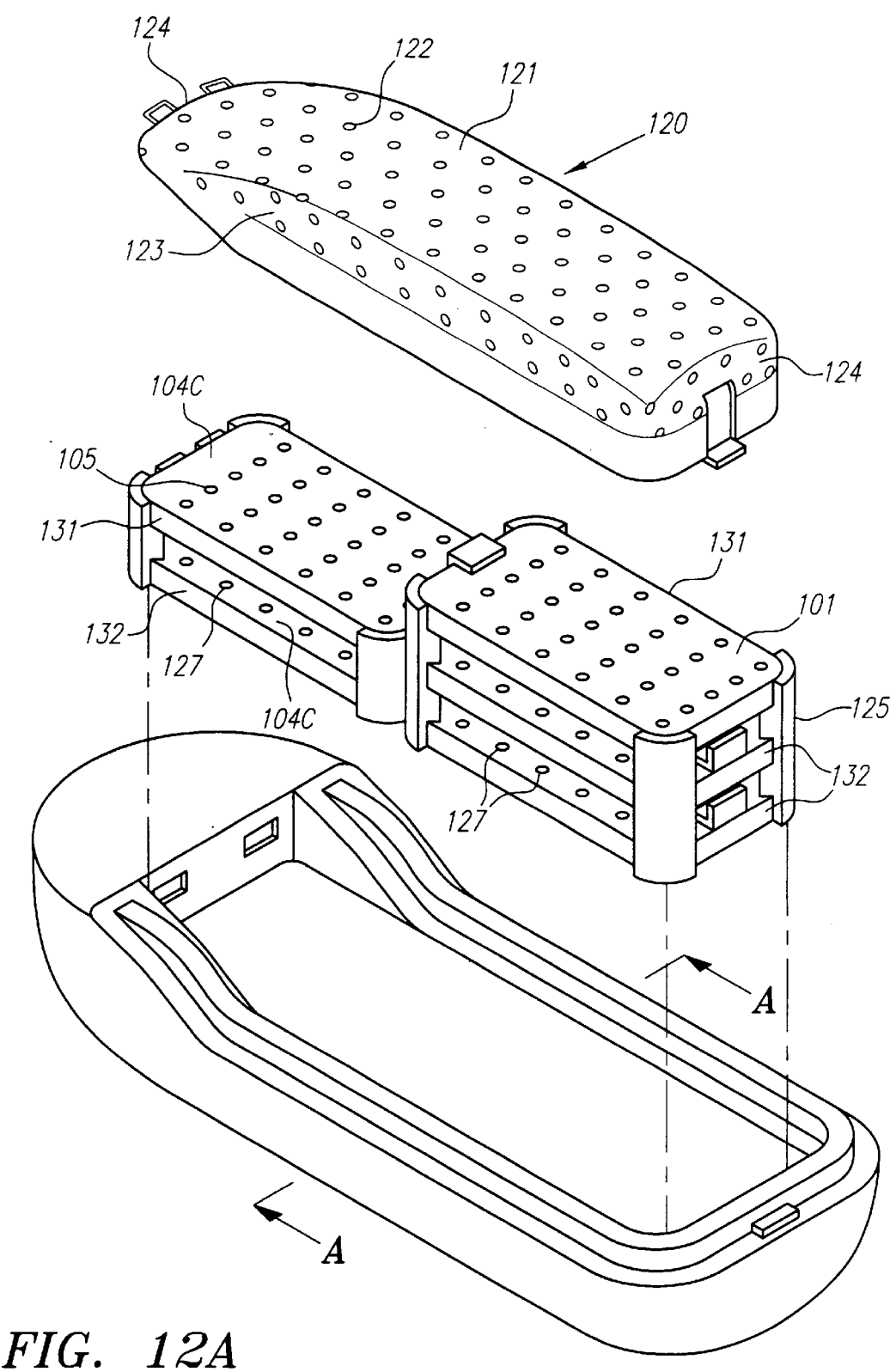
FIG. 12A is an exploded view of a battery pack and attached phone.
Figure 12B:
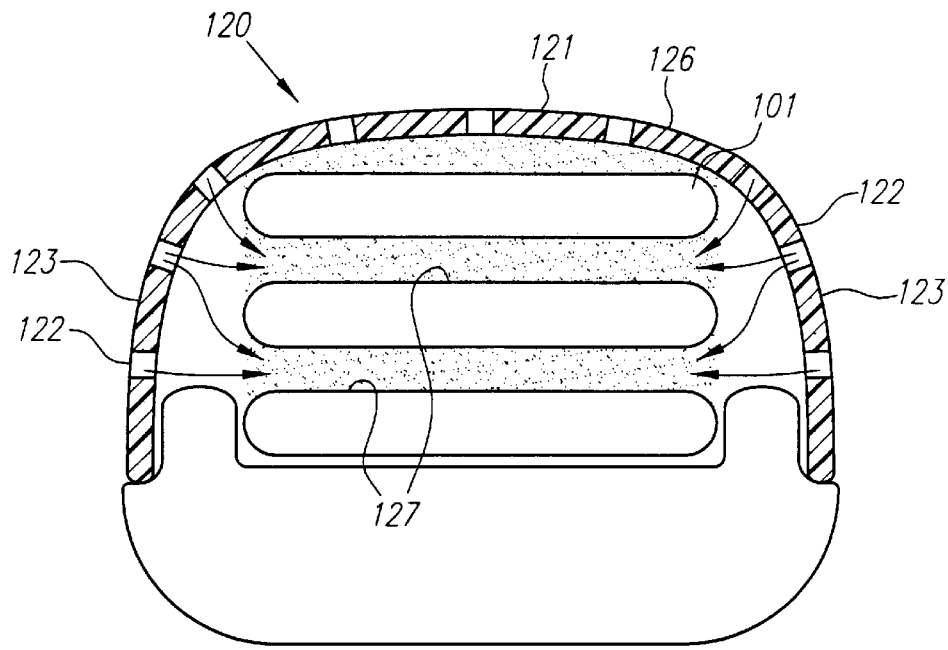
FIG. 12B is a cross-sectional view of the battery pack and mobile phone shown in FIG. 12A.

Referring to FIGS. 12A and 12B, the battery pack case 120 has a major surface 121 provided with a plurality of holes 122. In this embodiment, the major surface 121 of the battery pack case 120 is partially curved so that it merges with two side surfaces 123. The battery pack case 120 has two additional end surfaces 124 at the longitudinal ends of the battery pack case 120. One of the side surfaces 124 is sloped and one is substantially at right angles to the battery pack case major surface 121. Both are provided with air access holes 122. The shape of the battery pack case 120 is determined by the attachments connections, shape, and appearance of the particular type of cellular phone to be powered. The battery pack case 120 has a subassembly 125 of metal-air battery cells 101. The subassembly 125 of battery cells 101 includes a stack of three regularly spaced battery cells 101 and a stack of two regularly spaced battery cells 101.

All the metal-air battery cells 101 are connected in series through wires, a flexible strip, flexible circuit board or the like (not shown). The battery cells 101 are positioned in the battery pack case 120 such that the holes 105 on the gas-exchange wall 104C of each battery cell 101 face the major surface 121 of the battery pack case 120. A plenum 126 of approximately one millimeter or less is provided between battery cells 101 at the top position 131 in the subassembly 125 and the battery pack case major surface 121. As previously discussed, the thickness of the plenum 126 does not have to be large because of the short maximum distance between the air holes 105 and the openings 122 in the case 120. There are other plenums 127 between the battery cells 101 below the top position 131 battery cells 101 and the battery cells 101 directly below them. Many of the holes 105 in the battery cells 101 at the lower positions 132 are at least half the case's width from the nearest opening 122 in the case 120. Thus, the thickness of the plenums 127 should be substantially greater than the thickness of the plenum 126. A base (not shown) or the electronic device may attach to the battery pack case 120 to enclose the metal-air battery cells 101 within the battery pack.

Figure 13A:
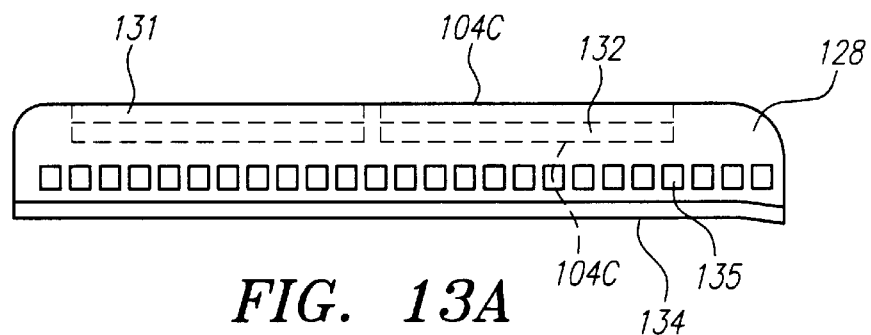
FIG. 13A is a side view of a battery pack.
Figure 13B:
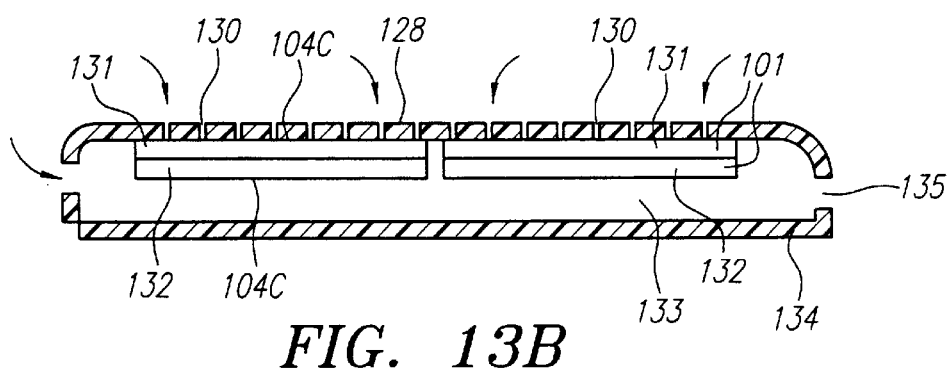
FIG. 13B is a cross-sectional view of the battery pack shown in FIG. 13A.

Referring to FIGS. 13A and 13B, an embodiment has four battery cells 101. A battery pack case 128 has a major flat surface 129 with air access holes 130. The gas-exchange wall 104C of the topmost battery cells 131 (i.e., the battery cells closest to the major flat surface 129 of the battery pack case 128) face toward the major flat surface 129 of the battery pack case 128 and are spaced apart by a small distance as discussed above. As discussed above, no plenum is necessary in this and other embodiments that ensure alignment between openings 130 in the case 128 and air access holes 105 in the battery cells 101.

The bottommost battery cells 132 are located and attached directly to the topmost battery cells 131. Between cells 131 and 132 there is an insulating material (not shown) which prevents shorts. The gas-exchange walls 104C of these battery cells face away from the major surface 129 of the battery pack case 128 to define a plenum 133 between the bottommost battery cells 132 and the base 134 (or, if there is no base 134, between the battery cells and the electronic device). Alternatively, a single layer of bicells can be used. Bicells have gas-exchange walls 104C on both major surfaces of the battery cell. The plenum 133 between the bottommost battery cells 132 and the base 134 preferably comports with the dimensional criteria (1–8) listed above. Air access holes or slots 135 are located around the entire periphery of the battery pack to supply air to plenum 133.

Figure 13C:
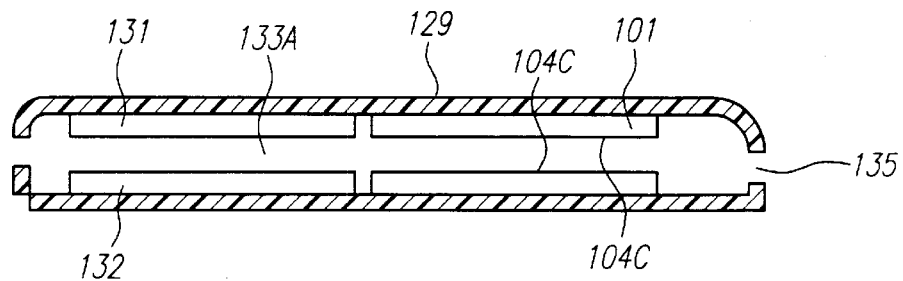
FIG. 13C is a cross-sectional view of the battery pack shown in FIG. 13D.
Figure 13D:
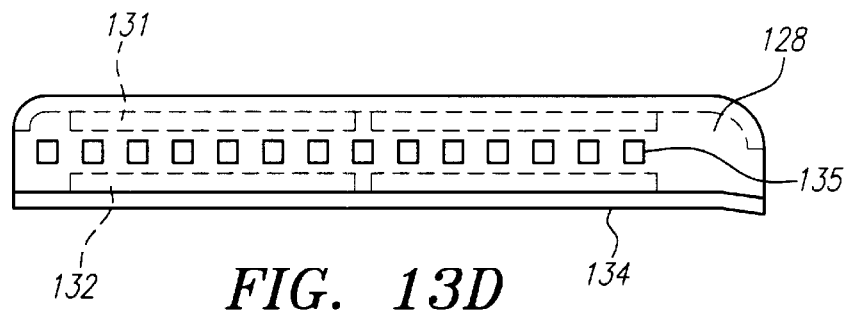
FIG. 13D is a side view of a battery pack.
Figure 13E:
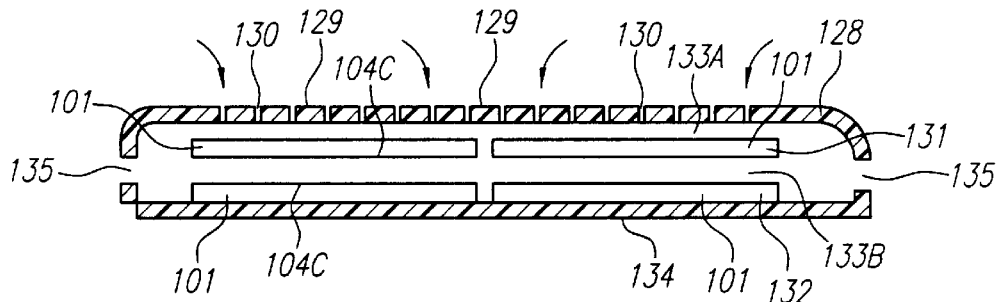
FIG. 13E is a cross-sectional view of a battery pack.
Figure 14A:
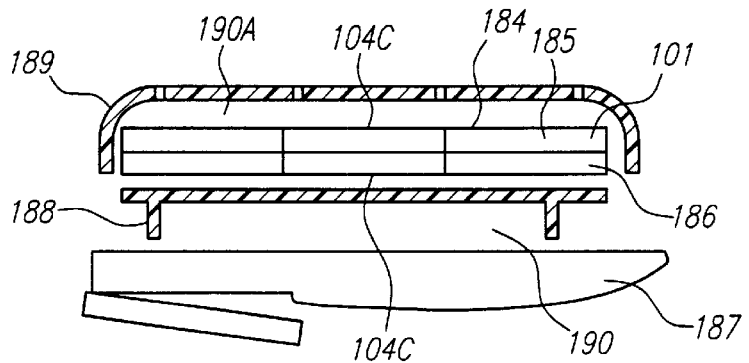
FIG. 14A is a side view of a battery pack and attached phone.
Figure 14B:
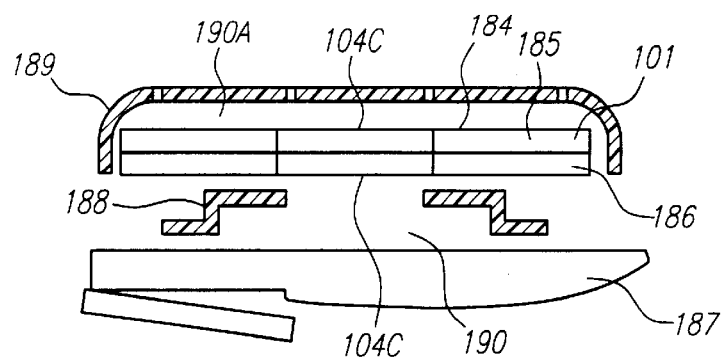
FIG. 14B is a side view of a battery pack and attached phone.
Figure 14C:
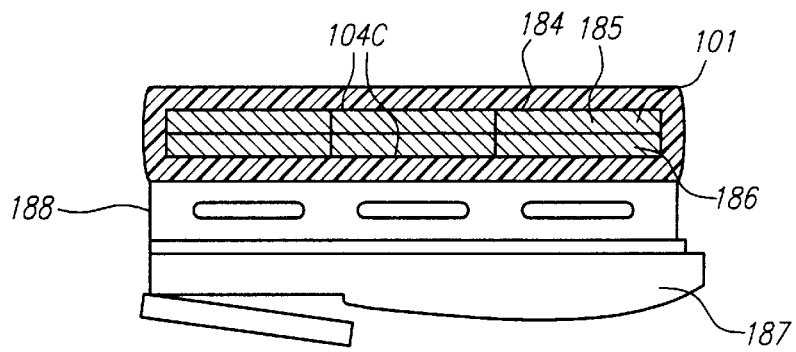
FIG. 14C is a side view of a battery pack and attached phone.
Figure 14D:
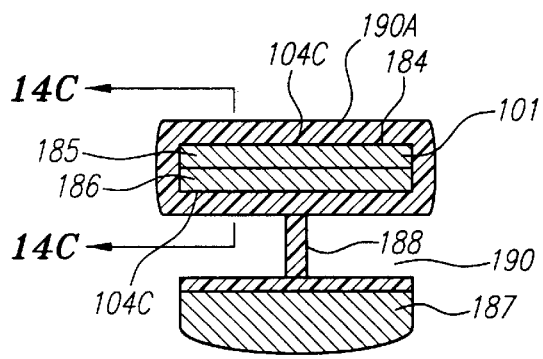
FIG. 14D is a cross-sectional view of the battery pack and attached phone shown in FIG. 14C.
Figure 14E:
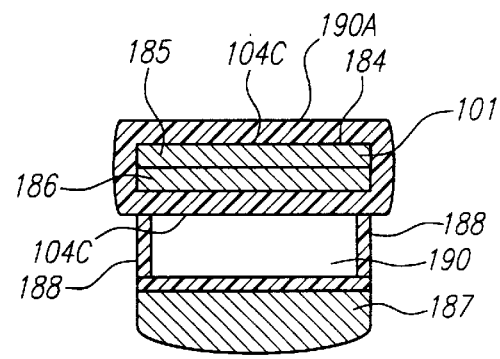
FIG. 14E is an alternative cross-sectional view of the battery pack and attached phone shown in FIG. 14C.

FIGS. 13C through 13E show two alternative configurations for placement of metal-air battery cells 101 within the battery pack case 128. FIGS. 13C and 13D show four battery cells 101 connected in series. A battery pack case 128 has a major flat surface 129 without air access holes. Additional air access holes or slots 135 are located around the periphery of the battery pack case 128. The topmost battery cells 131 are attached to the battery pack case 128. The gas-exchange wall 104C of the topmost battery cells 131 (i.e., the battery cells closest to the major surface 129 of the battery pack case 128) face away from the major surface 129 of the battery pack case 128 and toward the bottommost battery cells 132, defining a plenum 133A between the battery cells. Because the nearest openings are on the perimeter of the case 128, the thickness of the plenum 133A should be at least $\frac{1}{20}^{th}$ of half the width of the case 128 (assuming bulk flow is not possible or reliable). The bottommost battery cells 132 are attached to the battery pack base 134. The gas-exchange wall 104C of these battery cells 132 face the topmost battery cells 131.

In another configuration, as shown in FIG. 13E, a battery pack case 128 has a major flat surface 129 containing a plurality of air access holes 130. The gas-exchange wall 104C of the topmost battery cells 131 (i.e., the battery cells closest to the major surface 129 of the battery pack case 128) face the major flat surface 129 of the battery pack case 128 defining a plenum 133A (whose thickness is exaggerated) between the battery pack case 128 and the topmost battery cells 131. The bottommost battery cells 132 are located and attached directly to the battery pack base 134. The gas-exchange wall 104C of these battery cells 101 face the topmost battery cells 131 defining a plenum 133B between the battery cells. In keeping with the previously discussed design criteria, openings 135 in case 128 are located at opposite ends of plenum 133B defining a continuous channel to support cross-flow ventilation. In addition, the flow path between these opposing openings 135 is essentially straight. Its dimensions preferably conform to the guidelines listed above.

Referring to FIGS. 14A through 14E, two layers of battery cells 101 (or a single layer of bicells) are supported in a compact subassembly 184. The air access holes 105 on the gas-exchange wall 104C of each battery cell 101 face the exterior walls of the case 189. The subassembly 184 of battery cells 101 is then attached to the electronic device 187 (phone) by a standoff 188. The standoff 188 can be in the shape of a tee, single or multiple ridges, or any other shape that separates the subassembly 184 from the phone 187. The spacing between the phone 187 and the bottommost battery cells 186 defines a large open plenum 190 for delivery of oxygen to the battery cells 101. Additionally, a plenum 190A may be defined between the topmost battery cells 185 in the subassembly 184 and the battery pack case 189.

It is desirable to prevent or limit the obstruction of air access openings 107 and/or 112 in the battery pack case 102 (for example, due to the handling of a cellar phone by the user) thereby preventing full or partial oxygen starvation of the metal-air battery cells 101. Referring back to FIGS. 2A through 5A, and as previously discussed, the battery pack case 102 should have sufficient air access holes 107 and/or 112 spread over a large enough area so that sufficient gas exchange is obtained despite a partial obstruction of the battery pack case 102. Such obstruction can occur due to the appliance being held by a user, for example.

Figure 15:
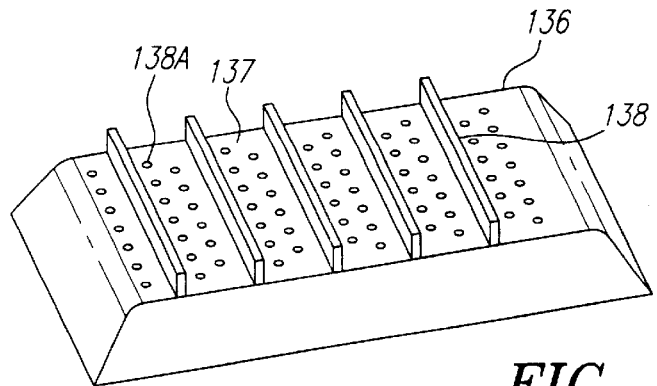
FIG. 15 is a perspective view of a battery pack case with a plurality of ridges to maintain an obstruction a minimum distance from the air access holes in the battery pack.

Referring to FIG. 15, in an alternative embodiment, the battery pack case major surface 137 has a plurality of projections or standoffs 138 substantially perpendicular to the battery pack case major surface 137. These standoffs 138 help to maintain the obstruction a minimum distance away from the air access holes 138A in the battery pack case 136. This embodiment helps to prevent the metal-air battery cells 101 from being starved for oxygen when the battery pack case 136 is placed on a flat surface or other obstruction, as would be the case if it were placed on a desk, car seat, pillow, or in a brief case. The standoffs 138 can be in the form of one or more ridges or one or more spaced-apart posts. Preferably, the standoffs 138 are molded as part of battery pack case 136. The air access holes 138A in the case 136 are positioned between the standoffs 138 in the quantity and size necessary to provide for sufficient gas exchange of the metal-air battery cells 101. The standoffs 138 elevate the battery pack when placed against an obstruction, allowing air to flow past the obstruction to the air access holes 138A in the battery pack case 136.

Referring back to FIG. 12B, the battery pack case 120 can alternatively be shaped as a large concave surface spanning its width, thereby precluding any flat obstruction from blocking a significant quantity of air access holes 122 in the battery pack case 120. The flat obstruction will only block air access holes 122 that are located on that portion of the battery pack case 120 that is generally parallel to the obstruction.

Figure 16:
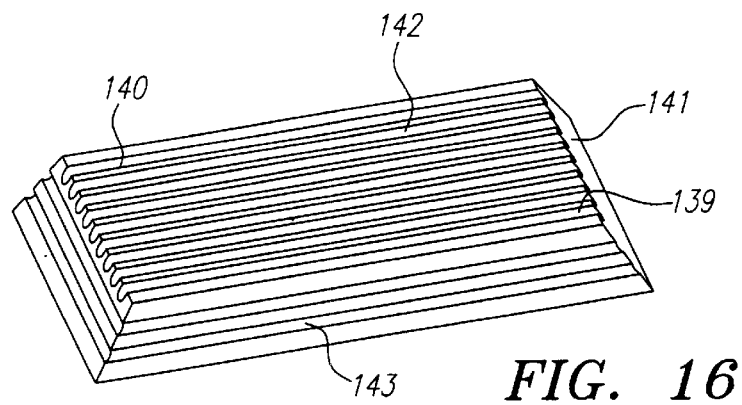
FIG. 16 is a perspective view of a battery pack case with a plurality of channels to prevent the inadvertent blockage of air access holes in the battery pack.
Figure 17:
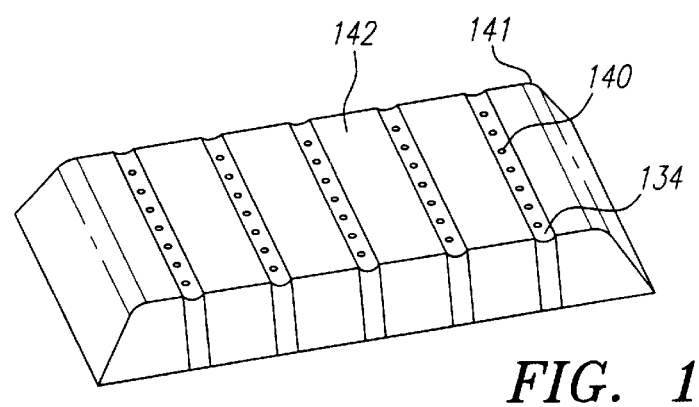
FIG. 17 is a perspective view of a battery pack case with a plurality of channels to prevent the inadvertent blockage of air access holes in the battery pack.

Referring now to FIGS. 16 and 17, indentations or channels 139 are used as an alternative method to prevent or limit the obstruction of the air access holes 140 in the battery pack case 141. A plurality of indentations (recesses) 139, channels, scallops, or grooves are formed on the major surface 142 of the battery pack case 141 and, alternatively, on the side surfaces 143 of the battery pack case 141. Air access openings 140 are placed at the bottom or side surface of the indentations or channels 139. The indentations or channels 139 can be of any shape or design that allow gas exchange when the battery pack case 141 is placed against an obstruction. Air travels through the indentations or channels 139 and into the air access openings 140 when the battery pack case 141 is obstructed by a flat surface.

Referring back to FIGS. 2A–5A, a plurality of air access slots 112 can be located only on the sides 112 of the battery pack case 102, the slots being placed in the side walls around the entire periphery of the battery pack case 102. The side walls can be concave (as shown in FIG. 5A), thereby providing an avenue for air to travel when the battery pack is being held during operation of the electronic device.

Referring back to FIG. 3, certain features prevent or limit water or other liquids from entering the battery pack. The battery pack case 102 can be perforated by a distribution of small air access holes 107. Preferably these holes 107 are of such a diameter and/or the case 102 of such material (hydrophobic) that liquid splashing onto the case 102 tends to beads up, and is substantially prevented from dripping into the case 102. The battery pack case 102 contains air access holes 107 that are large enough to permit air to diffuse through the battery pack case 102, but small enough to prevent water—due to surface tension of the water—from entering or exiting the battery pack case 102. In an alternative embodiment, the case 102 is made of air permeable porous plastic such as Porex ®. Porex Technologies, the manufacturer, makes molded parts of porous plastic from hydrophobic materials to resist water-entry through spillage. For example, polytetrafluoroethylene (PTFE) or Nylon 6 are suitable materials. The thickness and surface area of the battery pack case 102 are factors to consider when designing the battery pack. A battery pack case 102 that is thinner or has a large surface area will allow a greater amount of air to diffuse through to the metal-air battery cells 101.

Figure 18:
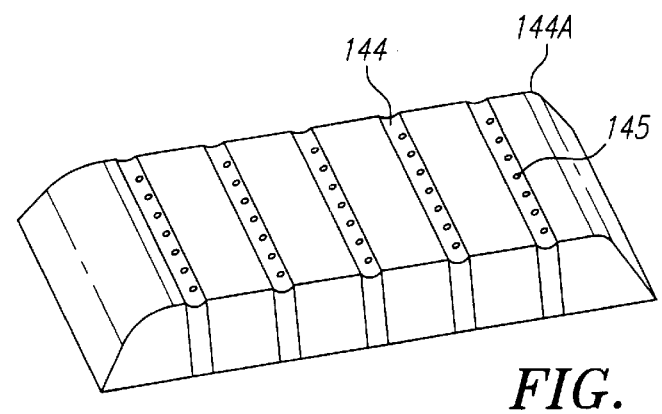
FIG. 18 is a perspective view of a battery pack case with a plurality of channels.
Figure 19:
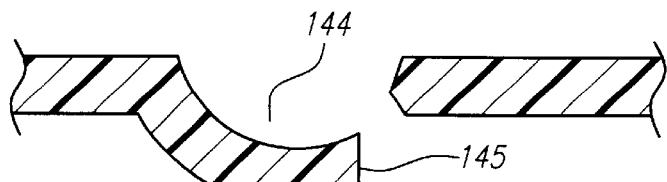
FIG. 19 is an exploded view of an air access hole shown in FIG. 18.
Figure 20:
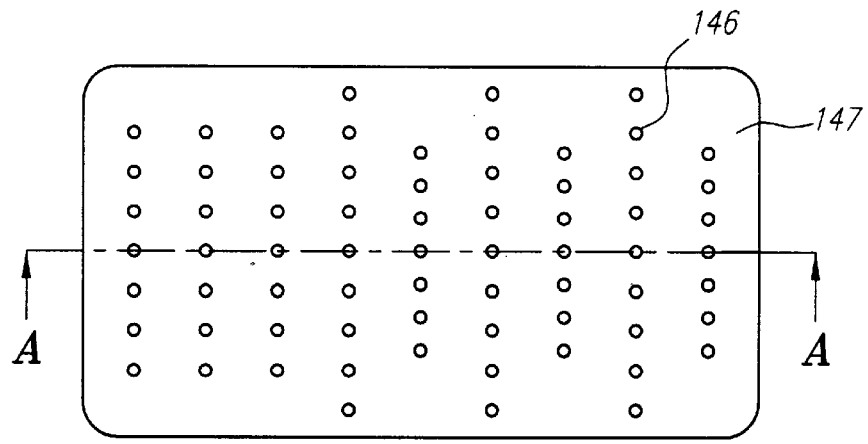
FIG. 20 is a top view of a battery pack.
Figure 21:
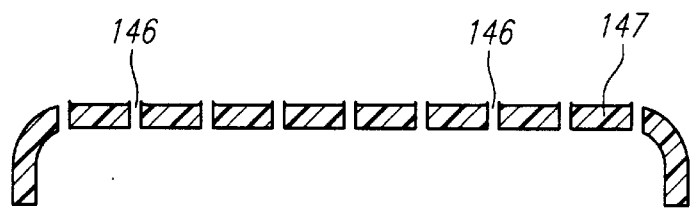
FIG. 21 is a cross-sectional view of the battery pack shown in FIG. 20.
Figure 22:
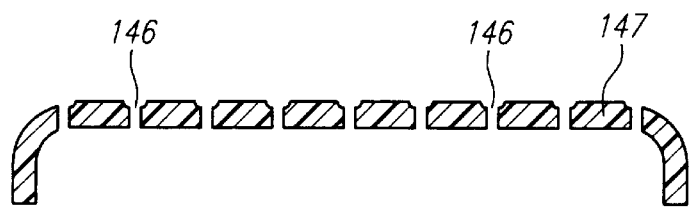
FIG. 22 is an alternative cross-sectional view of the battery pack shown in FIG. 20.

Alternatively, as shown in FIGS. 18 and 19, the air access holes 145 in the battery pack case 144A are located along the more vertical surface of the recesses or grooves 144 (i.e., not at the bottommost point of the recess) on the battery pack case. The recesses or grooves 144 provide a channel through which water is directed away from the air access holes 145. In an additional embodiment, as shown in FIGS. 20, 21 and 22, the openings of air access holes 146 are raised above much of the battery pack case's major surface 147 to form hollows through which water on the surface is guided without flowing into the holes 146.

Figure 23:
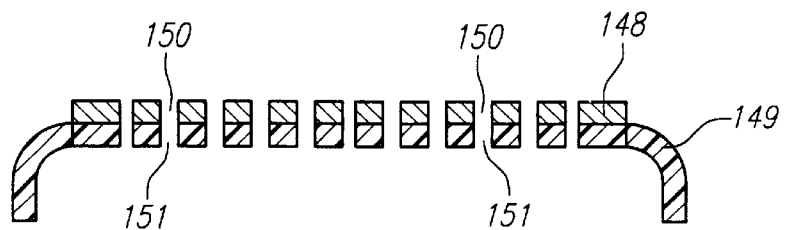
FIG. 23 is a cross-sectional view of the battery pack shown in FIG. 24.
Figure 24:
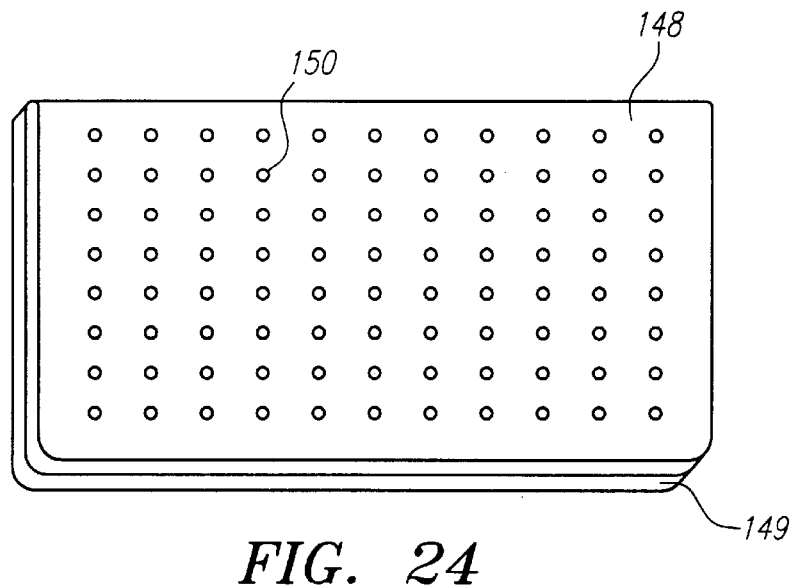
FIG. 24 is a perspective view of a battery pack with absorbent material on the exterior of the battery pack.
Figure 25:
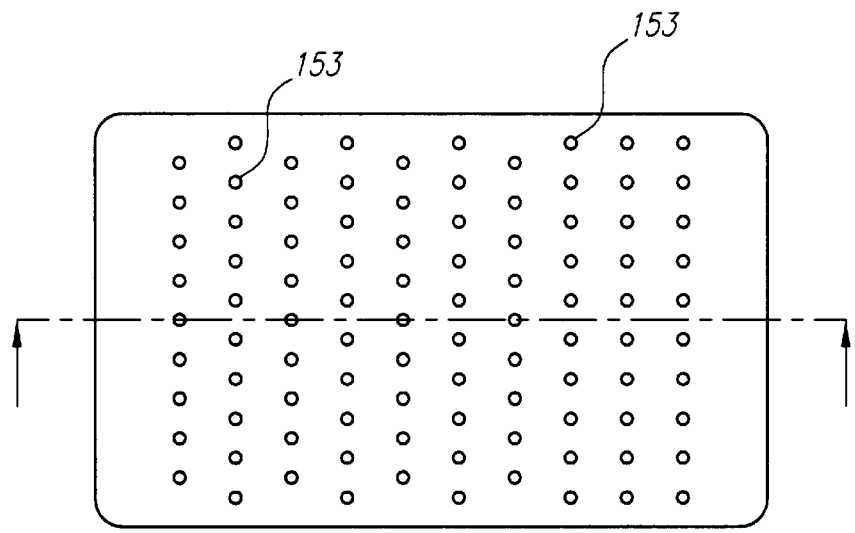
FIG. 25 is a top view of a battery pack.
Figure 26:
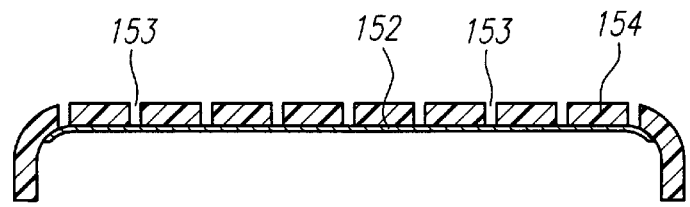
FIG. 26 is a cross-sectional view of the battery pack shown in FIG. 25.

In an additional embodiment, as shown in FIGS. 23 and 24, an absorbent material 148 is placed on the exterior of the battery pack case 149. The absorbent material 148 covers the major surface of the battery pack case 149. Air access holes 150 in the absorbent material are punched to correspond to air access holes 151 in the battery pack case 149. The absorbent material 148 allows air to enter into the battery pack while preventing water from entering the battery pack. The absorbent material 148 may add a non-slip surface to the battery pack to help users grip or handle the electronic device. As shown in FIGS. 25 and 26, a battery guard 152 can be used to cover the air access holes 153 in the battery pack case 154, allowing the diffusion of air while keeping liquids out. The battery guard 152 is preferably a porous hydrophobic material that is permeable to air. The battery guard 152 can be, but does not need to be, constructed from an absorbent material. The battery guard material should also be resistant and impermeable to KOH, preventing any KOH that escapes the metal-air battery cells 101 from exiting the battery pack. The battery guard 152 is constructed from sheets of material and placed on the interior of the battery pack case 154.

Alternatively, metal-air battery cell subassemblies (such as those subassemblies 125 described in FIG. 12A) are tightly wrapped or inserted inside a pocket or bag constructed of the porous material. The wrapped subassemblies (not shown) are attached to the battery pack case. The entire subassembly can be wrapped, or, alternatively, different stacks of battery cell subassemblies can be wrapped. The battery guard can also be constructed from a material that can be injected into the air access holes or slots in the battery pack case. The battery guard filters the air entering the battery pack, absorbing any excess moisture while allowing air to travel to the metal-air battery cells.

After the metal-air battery cells 101 are constructed, the battery cells 101 must be electrically interconnected and securely attached to the battery pack case. This can be accomplished through the use of a separate support structure, a support structure built into the battery pack case, or the battery cells 101 being otherwise supported by the case.

Due to possible expansion of the metal-air battery cells 101 resulting from zinc-oxide formation during discharge, the support structure configuration should be flexible enough to accommodate changes in the shape of the metal-air battery cells 101. Alternatively, the material from which the support structure is constructed is, itself, sufficiently flexible, compressible or non-interfering structurally to the battery cells 101 to accommodate changes in shape of the metal-air battery cells 101.

Figure 27:
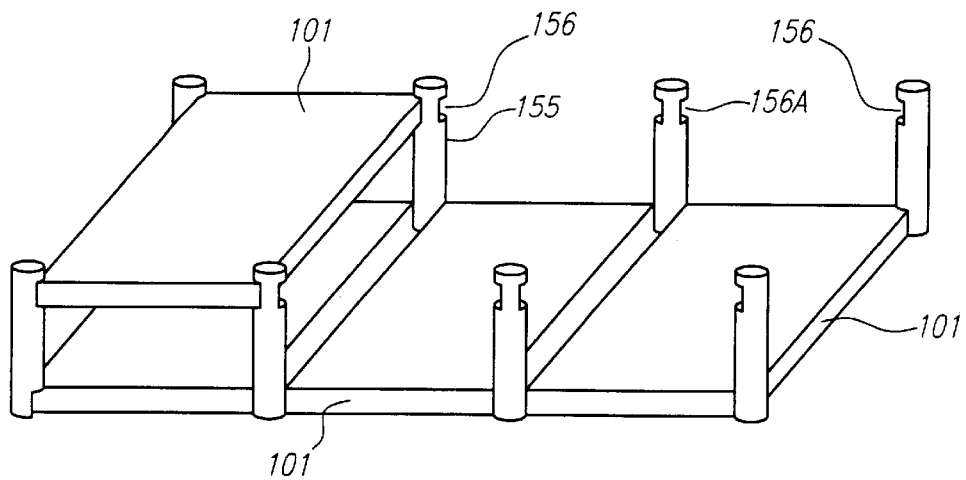
FIG. 27 is perspective view of a support structure with attached battery cells.

FIG. 27 shows one embodiment that provides for the secure placement of the plurality of metal-air battery cells 101 in the battery pack case (not shown). The structure 155 contains a plurality of compartments, each compartment having projections 156 upon which the battery cells 101 are secured (snap fit). After each metal-air battery cell 101 is placed in the structure 155, the structure 155 is securely connected to the battery pack case.

The structure 155 is made of a material that allows the projections 156 to expand when the thickness of the battery cells 101 increases. Additionally, the structure 155 is made of a material that allows the standoffs 156A to flex when the length or width of the individual battery cells 101 expand. The projections 156 in the support structure 155 can also be designed so that they do not interfere with expansion along the length or width of the battery cell 101.

Figure 28:
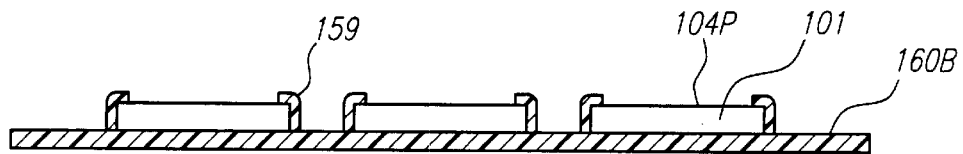
FIG. 28 is a cross-sectional view of a battery pack base.
Figure 29A:
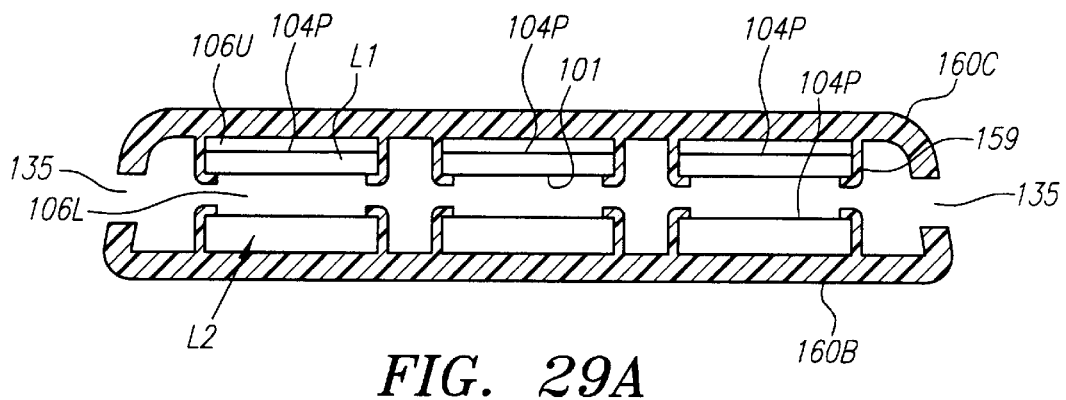
FIG. 29A is a cross-sectional view of a battery pack that supplies oxygen to the battery cells using two internal plenums.
Figure 29B:
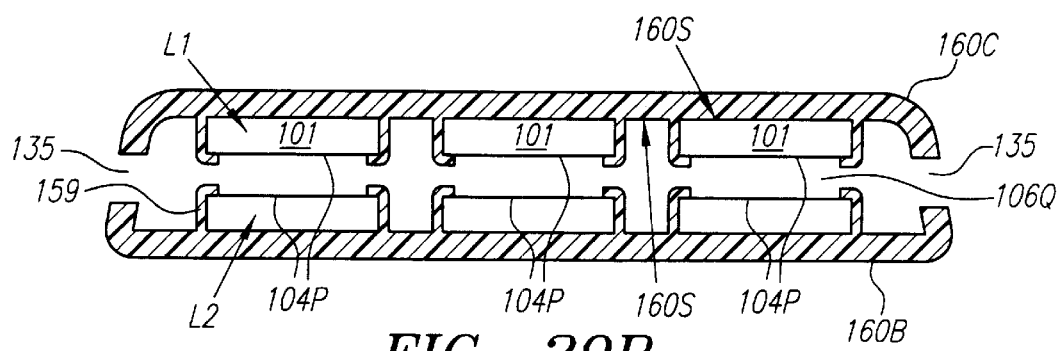
FIG. 29B is a cross-sectional view of a battery pack that supplies oxygen to the battery cells using one internal plenum.
Figure 30:
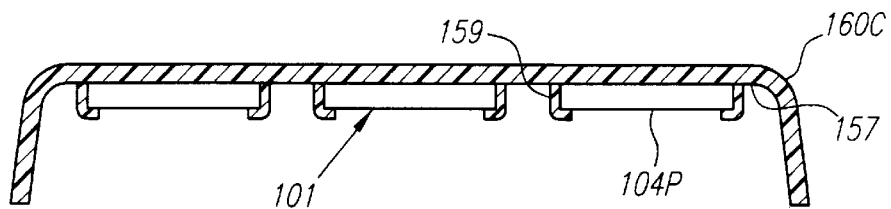
FIG. 30 is a cross-sectional view of a battery pack case used in combination with the battery pack base shown in FIG. 28.
Figure 31:
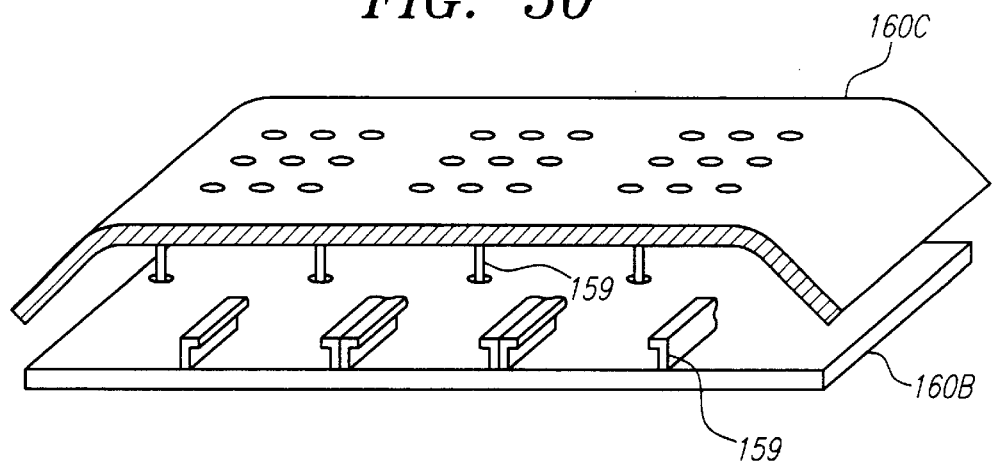
FIG. 31 is a perspective view of a battery pack case and battery pack base.

Alternatively, as shown in FIGS. 28 and 30, a battery pack case, composed of a cover 160C (FIG. 30) and a base 160B (FIG. 28), supports battery cells 101 on projections 159 by a snap fit, which is provided for by the shape of the projections 159. Referring to FIG. 29A, two layers of battery cells L1 and L2 are defined as shown, an upper layer (L1) held by the projections 159 extending from the cover 160C and a lower layer (L2) held by the projections 159 extending from the base 160B. The gas-exchange walls 104P of the battery cells 101 of the upper and lower layers L1 and L2 may face the same direction in which case an upper plenum 106U and a lower plenum 106L are defined. Referring to FIG. 29B, alternatively, gas-exchange walls 104P of the battery cells 101 of the upper and lower layers L1 and L2 may face each other in which case a single lower plenum 106Q is defined. In the latter case, the battery cells 101 can be held directly against a bottom surface 160S of cover 160C. FIG. 31 shows an additional embodiment demonstrating that the battery cells 101 can be retained by ridges 159 on the battery pack cover 160C and base 160B.

Figure 32:
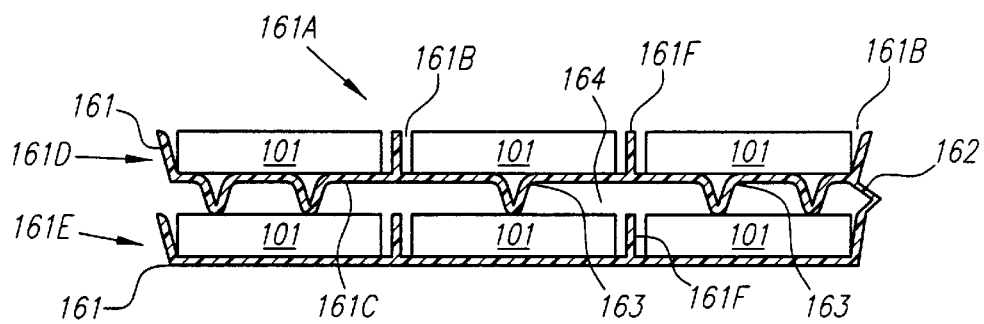
FIG. 32 is a side view of a battery pack support structure and battery cells.
Figure 33:
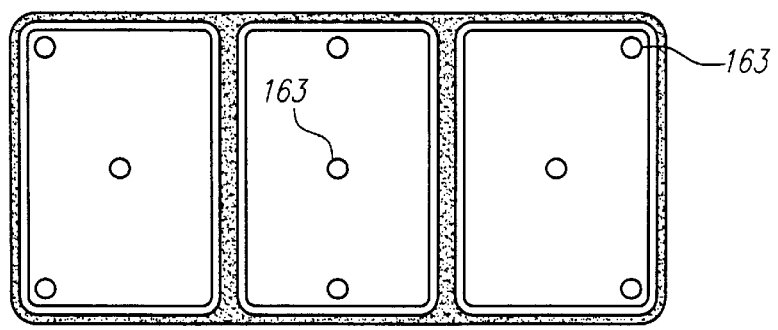
FIG. 33 is a top view of the battery pack support structure and battery cells shown in FIG. 32.

The support for the battery cells 101, preferably, should be compatible with automated production. As shown in FIGS. 32 and 33, an embodiment of a low cost support structure 161A for the battery cells 101 is a spacer design with a pair of partitioned trays 161 joined by a living hinge 162 integral with the trays 161. The entire support structure 161A may be created by vacuum-forming. Each tray 161 contains a recess 161B for a respective battery cell 101. Integrally formed in a bottom 161C of each tray 161 are standoffs 163 that maintain a separation between the layers 161D and 161E, thereby defining a plenum 164 between the layers 161D and 161E of battery cells 101 when the support structure 161A is in the final configuration as shown. The recess 161B of each tray 161 is closed and can accept, within it, an absorbent material (not shown) to soak up any leaking electrolyte.

Partitions 161F between battery cells help to prevent liquids, particularly those leaking from the battery cells 101, from shorting the battery. The partitions 161F also keep each battery cell 101 in place and electrically separated from the other battery cells 101. The shapes of the partitioned areas for each battery cell 101 may include integral engaging elements or protrusions (not shown) to provide for snap-fit of the battery cells 101 into place. Alternatively, battery cells 101 can be attached by an adhesive to the back plane of each partitioned area. The partitioned areas may be closed or open.

Figure 34A:
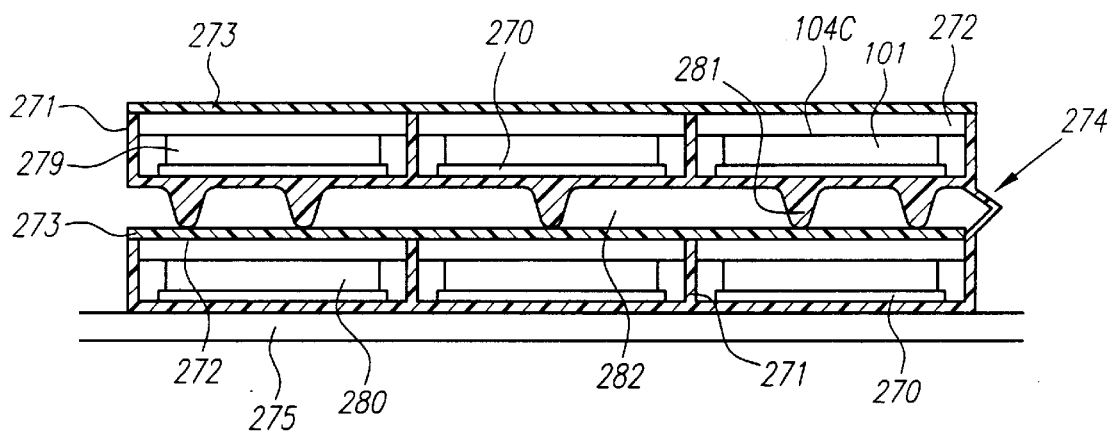
FIG. 34A is a side view of a battery pack support structure and battery cells.
Figure 34B:
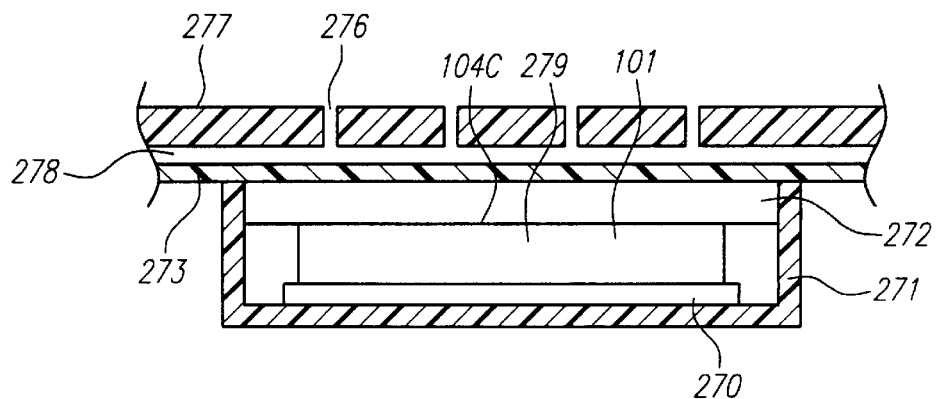
FIG. 34B is an exploded view of a section of the support structure shown in FIG. 34A.

Referring to FIGS. 34A and 34B, a support structure 274 includes an absorbent material 270, which absorbs and holds any liquid entering the case or leaking from the battery cell 101. Metal-air battery cells 101 are placed on top of the absorbent material 270, with the air access holes 105 on the gas-exchange wall 104C of the battery cells 101 facing away from the absorbent material 270. A diffuser 272 is optionally placed on top of the metal-air battery cells 101. The diffuser 272 helps to distribute air (and thus oxygen) to the air access holes 105 in the battery cells 101, to keep them in the trays 271, and to maintain a separation distance (at least the thickness of the diffuser 272) from the case 277. Since the battery cells 101 in the top layer are adjacent a wall with many holes 276, the distance between the case openings 276 and the battery cell openings 105 is small. Thus, the gas exchange is driven by diffusion and the spacing between the case 277 and the battery cell 101 can be very small as given by the dimensional design guidelines listed above.

The partitioned trays 271 enclose the bottom and sides of the battery cells 101. An air permeable hydrophobic plastic layer 273, such as PTFE, is attached by an adhesive, or other means, to the top side surfaces of the partitioned trays 271, enclosing the absorbent material 270, battery cell 101, and diffuser 272 within the partitioned tray 271. The air permeable layer 273 prevents any KOH, or other liquid from leaking out or entering the tray 271 recesses.

The support structure 274 is attached to the base 275 of the battery pack. Air access holes 276 are located on the battery pack case 277. As shown in FIG. 34A, diffuser 278 is positioned between the inside surface of the battery pack case 277 and the air permeable layer 273 of the top layer battery cells 279. The diffuser 278 can be attached to the inside of the battery pack case 277. The diffuser 278 prevents dead zones by maintaining a minimum separation distance. The diffuser 278 may be eliminated. Air access holes 276 in the battery pack case 277 can be aligned precisely with the holes 105 of the battery cells 101 closest to the case wall. In this case, there can be a very small separation between the battery cells 101 and the case wall.

In still another embodiment, the air permeable hydrophobic plastic layer 273 is attached to the top side surfaces of the partitioned trays 271, such that the plastic layer 273 is not in tension. Diffusers 272 and 278 can be eliminated and their function served by bumps, ridges or posts on the interior of the battery pack case 277 to ensure that the plastic layer 273 does not cover the holes 276 in the battery pack case 277. Additionally, bumps may be placed on the gas-exchange wall 104C of the battery cell 101 to ensure that the plastic layer 273 does not obstruct the air access openings 105 in the battery cells 101.

Figure 35:
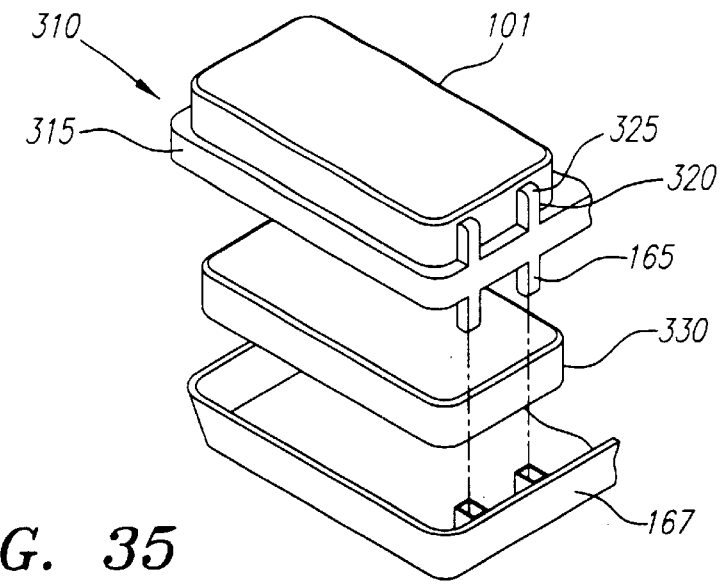
FIG. 35 is an exploded view of a support structure, battery cells and battery pack base.

Referring to FIG. 35, another support 310 can be formed by various means, for example, injection molded plastic. The support 310 has precisely defined skirts 315 and retainers 320 for each battery cell 101. Each retainer 320 has engagement protrusions 325 shaped to allow the battery cells 101 to be snapped into place. Also, each retainer 320 or leg 165 plays the additional role of acting as a standoff to separate the respective battery cells 101 held in the support 310 from the other battery cells and/or the battery pack case 167. Each support accommodates a given number of battery cells. Each support 310 has standoffs 165 to separate the layers of battery cells 101 insuring the minimum spacing required. Each support 310 has engagement protrusions 325 to hold the battery cells 101 in place. The back 167 of the battery pack case is molded to hold the battery cells 101 in the lower layer in place as shown.

Figure 36:
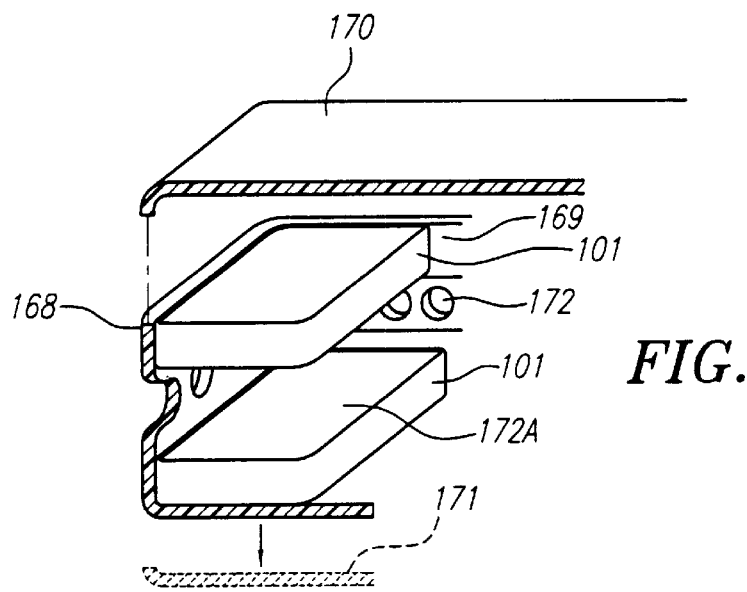
FIG. 36 is an exploded view of a support structure, battery cells and battery pack.

Referring to FIG. 36, in another embodiment, support for the battery cells 101 is provided by the shape of the battery pack case itself. The two-part case has a skirt portion 168 with molded protrusions or bumps 169 positioned such that the battery cells 101 snap into place from either of the top or bottom direction. A cover 170 is then snapped onto the skirt 168 to form the completed housing. Another cover 171 may be placed, opposite the first 170, to fully enclose the battery cell chamber. Note that holes 172 may be formed in the recess that defines the supports for the battery cells 101 and placed so that a significant number of holes 172 cannot be covered by a user's hand causing suffocation of the battery cells 101. Alternatively, a concave channel (not shown) can be formed in the skirt portion 168 of the case in which the air access holes 172 are placed. The channel prevents the blocking of the air access holes 172 by a generally planar obstruction, or when the battery pack is being handled.

Figure 37:
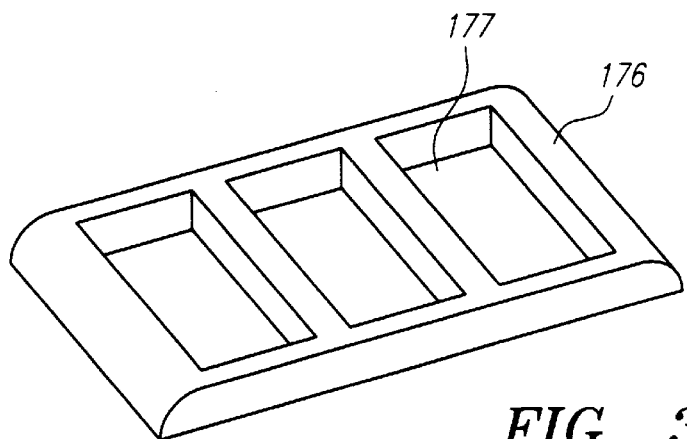
FIG. 37 is a perspective view of a hard foam support structure containing punched out openings for battery cells.
Figure 38:
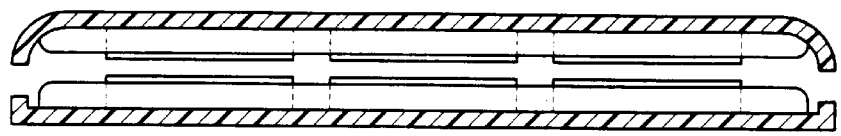
FIG. 38 is a cross-sectional view of a battery pack with a hard foam support structure containing punched out openings and pressed fit battery cells.
Figure 39:
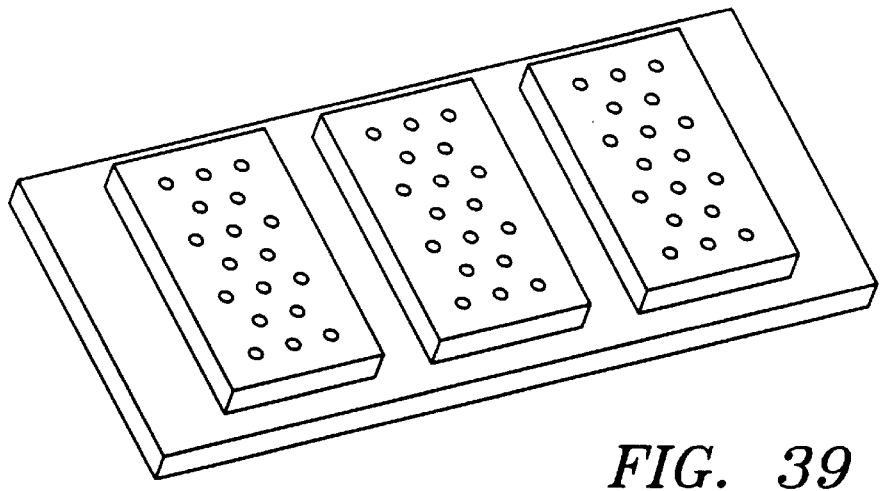
FIG. 39 is a perspective view of a hard foam support structure and battery cells.
Figure 40:
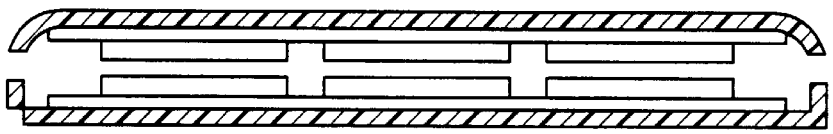
FIG. 40 is a cross-sectional view of a battery pack with a hard foam support structure and battery cells.

FIGS. 37 through 40 show additional support or spacer designs. In these designs, battery cells 101 are held in a hard foam retainer 176. As shown in FIGS. 37 and 38, recesses 177 receive the battery cells 101. The battery cells 101 may be held by resilient engagement in the foam 176 or attached by adhesive to the blind end of the recess 177. That is, a force fit holds the battery cells 101 to the foam 176, which is attached to the battery pack case 178 and the base 179. The foam 176 may be attached by bonding to the case 178 and base 179. The battery cells 101 can face towards each other, creating an internal plenum 179A. The flexibility of the foam retainer 176 allows for expansion of the battery cells 101. Alternatively, as shown in FIGS. 39 and 40, the battery cells 101 may be attached directly to the foam 173. The foam 173 is then attached to the battery pack case 174 and the battery pack base 175. Additionally, the foam can be made of, or incorporate an absorbent material to control any leakage into or out of the battery pack.

In an additional embodiment, internal circuitry or external components in the battery pack prevent charging of the battery pack. Alternatively, internal circuitry in the battery pack limits charging of battery cells to a controlled rate. A current limiting device is provided that limits current to an acceptable level. The threshold level can be controlled by voltage detection. The current limiting device can also be limited by time as well. Any continuous current is blocked whereas pulsed currents would be permitted.

Figure 41:
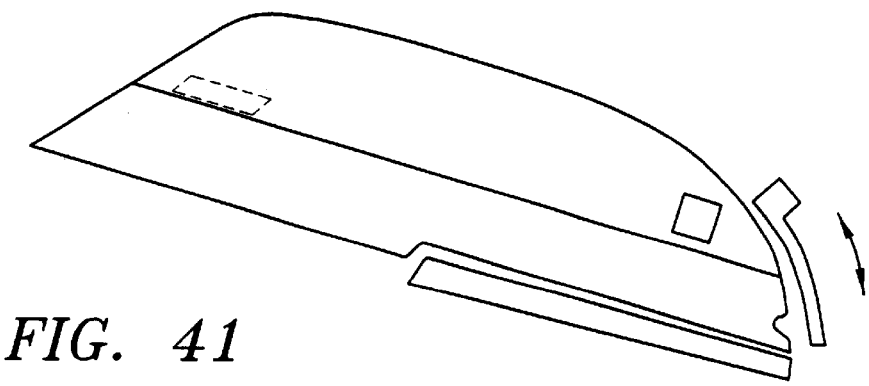
FIG. 41 is a side view of a battery pack and attached phone.

FIG. 41 shows an additional embodiment that includes a battery switch 180 connected to the exterior of the battery pack 181. The switch 180 moves between on and off positions, the on position connecting the primary battery (not shown) to the phone 182 and the off position disconnecting the primary battery. The switch 180 can also be used to prevent the phone 182 from accessing hands-free devices, such as those in cars, when the primary battery is switched to the on position. When the primary battery is switched to the off position, the switch 180 allows access to the hands-free device. Alternatively, a rechargeable battery 183 is included. The rechargeable battery can connect to the phone when the primary battery is switched off. The rechargeable battery 183 provides power to the cellular phone when the primary battery is switched off and placed into the hands-free device. The hands-free device charges the rechargeable battery 183.

Figure 42:
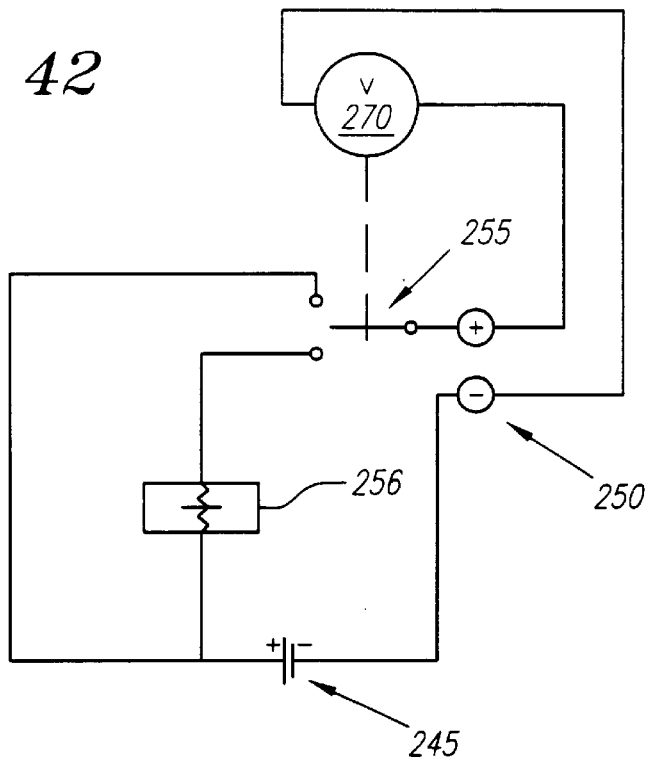
FIGS. 42 and 43 are circuit diagrams for a DPST switch.

Referring to FIG. 42, a DPST switch 255 connects terminals 250 to the metal-air battery cells 245 selectively either through a current limiter 256 or directly. It is presumed that the terminals 250 are connected either to the load or to the charging source. The current limiter 256 may be a simple current limiter, such as a resistor, or a smart current limiter that increases resistance based on a time-integrated current (total charge). The current limiter 256 prevents the metal-air battery cells 245 from being charged, which may in turn cause the battery cells 245 to leak. Alternatively, current limiter 256 may be removed altogether. Switch 255 is actuated by a voltage detector 270, which may compare the detected voltage with a reference voltage, when the measured voltage exceeds the threshold voltage. When a charger is connected, the voltage would exceed the threshold voltage. Alternatively, the detector 270 may detect a sudden change in voltage or even a change in impedance to indicate connection to a charger. When the detector 270 indicates the connection to a charger, the switch 255 is, by mechanical interlock or some other means, placed in the position to connect the metal-air battery cells 245 only through the current limiter 256, if present. When the detector 270 indicates disconnection from the charger, or connection to a load, the switch 255 is placed in the position to connect the terminals 250 directly to the metal-air battery cells 245. Still another alternative is to provide an additional battery (not shown) that maintains power to the phone during periods when the metal-air battery cells 245 are disconnected from the terminals 250 and no outside source of power is connected. Such a battery may be a small chargeable battery and may be connected directly across the terminals 250 so that it is charged when a charging voltage is applied across the terminals 250 and drained when a load is applied across the terminals 250.

Figure 43:
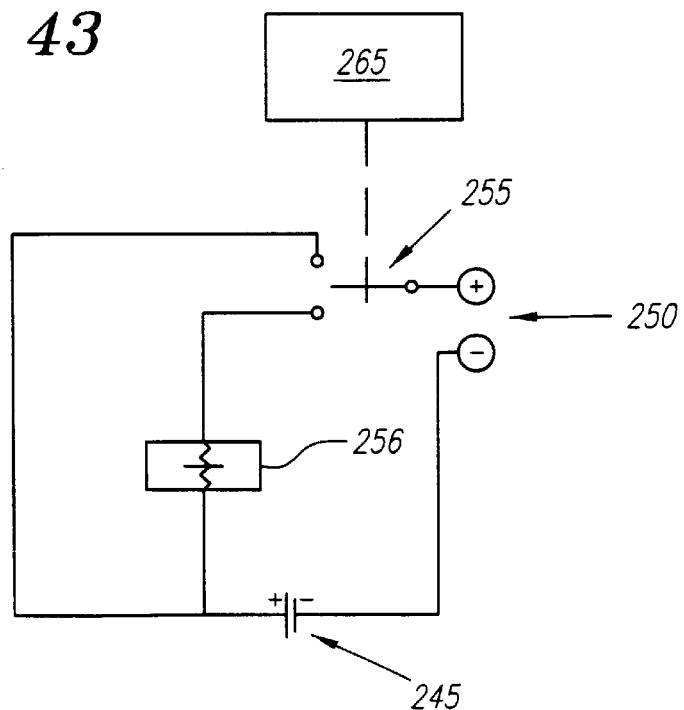

Referring to FIG. 43, a DPST switch 255 connects terminals 250 to the metal-air battery cells 245 selectively either through a current limiter 256 or directly. It is presumed that the terminals 250 are connected either to the load or to the charging source. Current limiter 256 may be a simple current limiter such as a resistor or a smart current limiter that increases resistance based on a time-integrated current (total charge). The current limiter 256 prevents the metal-air battery cells 245 from being charged, which may in turn cause the battery cells 245 to leak. Alternatively, current limiter 256 may be removed altogether. Switch 255 is actuated by the hands-free adapter port cover, which is indicated symbolically by the block 265. When the hands-free adapter port cover is placed in a position such that it blocks access to the adapter port, the switch 255 is, by mechanical interlock or some other means, placed in the position to connect the terminals 250 directly to the metal-air battery cells 245. When the hands-free adapter port cover permits access to the adapter port, the switch 255 is placed in the position to connect the metal-air battery cells 245 only through the current limiter 256, if present. Still another alternative is to provide an additional battery (not shown) that maintains power to the phone during periods when the metal-air battery cells 245 are disconnected from the terminals 250 and no outside source of power is connected. Such a battery may be a small chargeable battery and may be connected directly across the terminals 250 so that it is charged when a charging voltage is applied across the terminals 250 and drained when a load is applied across the terminals 250.

Figure 44:
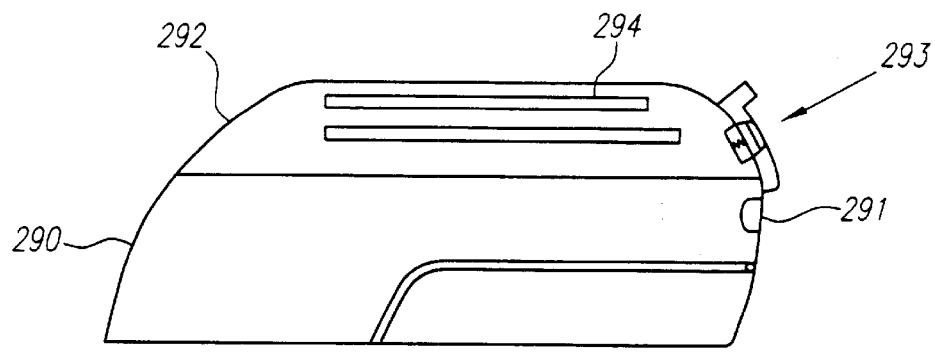
FIG. 44 is a cross-sectional view of a cellular phone and attached battery having a switching mechanism.

Referring now to FIG. 44, in an alternative embodiment for use in a hands-free environment, a cellular phone 290, having an outlet 291, is attached to a battery pack 292 having a sliding switch mechanism 293. The battery pack 292 also has shutters 294.

In a hands-free environment, the cellular phone 290 is connected to an outlet connector (not shown) via the outlet 291. In many hands-free environments, the outlet connector (not shown) connects the cellular phone 290 to a separate microphone, antenna, and speaker. The cellular phone user can operate the cellular phone 290 without having to hold the cellular phone 290, thereby creating a hands-free environment. In many hands-free environments, the outlet (not shown) also provides the cellular phone 290 with the power to operate the phone 290, eliminating the need for the battery pack 292. In some instances, the outlet connector (not shown) can recharge a secondary battery attached to the phone.

However, attempting to charge the battery pack 292 may shorten the useful life of the battery cells 101 contained in the battery pack 292. Most metal-air battery cells 101 are not designed to be recharged.

The sliding switch mechanism 293 attached to the battery pack 292 can reduce the likelihood that the battery cells 101 in the battery pack 292 will be accidentally "recharged." The sliding switch mechanism 293 can also act as a communicating means to the shutters 294 of the battery pack 292, communicating to the shutters 294 when to open or close. When the outlet 291 of the battery pack 292 is attached to the outlet connector (not shown), the outlet connector (not shown) provides the cellular phone 290 with the energy to operate. As an alternative to embodiment of FIG. 44, a mold can be inserted in the outlet to prevent the user from attaching a recharging outlet connector to the phone.

Figure 45:
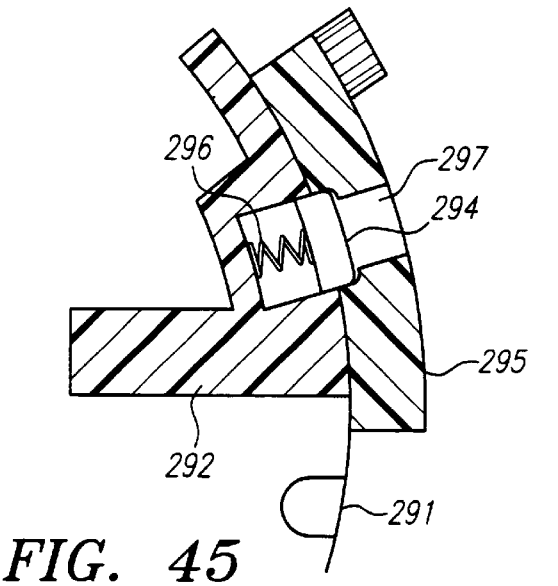
FIG. 45 is a partial cross-sectional view of the sliding switch mechanism of the embodiment of FIG. 44.

Referring now to FIG. 45, a button 294, which is held in place by a spring 296, prevents a switch 295 from sliding along a groove (not shown). When the switch 295 is in this position, the battery pack 292 is electrically disconnected from the cellular phone 290. Then the outlet 291 of the cellular phone 290 can be connected to the outlet connector (not shown). The shutters 294 are then closed. Disconnecting the battery pack 292 prevents the battery cells 101 contained in the battery pack 292 from accidentally "recharging." Closing the shutters 294 slows the rate at which the battery cells 101 desiccate.

Figure 46:
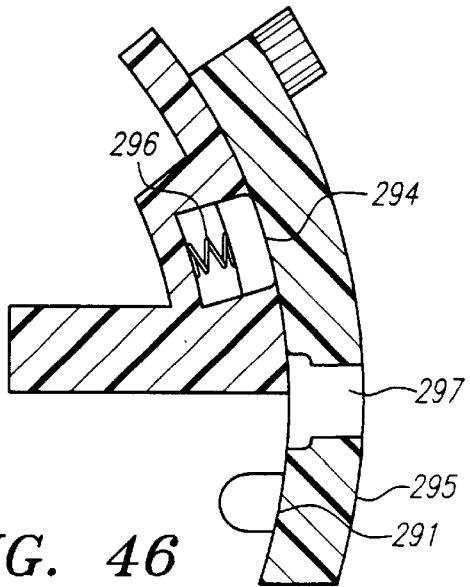
FIG. 46 is a different partial cross-sectional view of the sliding switch mechanism of the embodiment of FIG. 44.

Referring now to FIG. 46, the switch 295 slides to cover the outlet 291, blocking the outlet connector (not shown) from connecting to the outlet 291. Sliding the switch 295 is accomplished by simultaneously pressing the button 294. When the switch 295 is in the illustrated position, the shutters 294 are open and the battery pack 292 is electrically connected to the cellular phone 290.

In an additional embodiment not illustrated, power is supplied through a diode connected in series with the battery pack, preventing charging currents from being applied to the battery cells. In one embodiment, the maximum diode voltage drop will be 0.35V at 2A. The diode rating needs to be appropriate to a GSM current profile of 2×0.2A. The diode failure rate after 2 years of shelf life and 50 hours of operation will be below 1 in 100,000. Alternatively, audio (such as beeps) or visual (such as flashing light) devices can be connected to the battery pack and triggered to alert the user when there is inadvertent charging of the battery pack.

Figure 47:
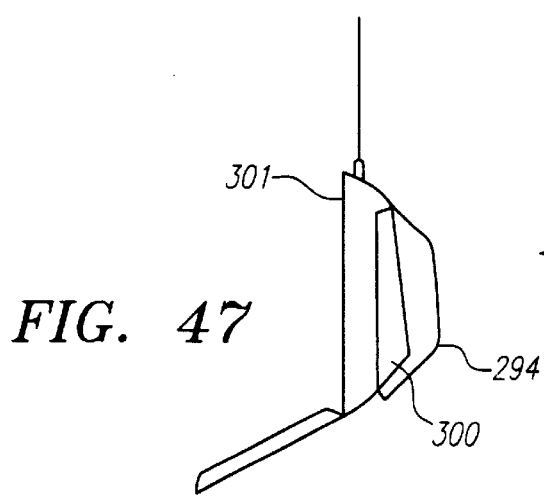
FIG. 47 is a cross-sectional view of a cellular phone, attached rechargeable battery and an attached battery pack.

Referring now to FIG. 47, in an alternative embodiment, a battery pack 299 is attached to a rechargeable battery 300, which is attached to a cellular phone 301. When the battery pack 299 is attached to the rechargeable battery 300, the battery pack 299 powers the cellular phone 301 and recharges the rechargeable battery 300. The battery pack 299 can be attached to the rechargeable battery 300 by a latching mechanism (not shown). In certain cellular phone/rechargeable battery configurations, it may be necessary to connect the battery pack 299 to the cellular phone 301 instead of the rechargeable battery 300.

A cellular phone user can attach the battery pack 299 to the rechargeable battery 300; operate the cellular phone 301 and recharge the rechargeable battery 300; and later disconnect the battery pack 299 from the rechargeable battery 300 when recharging is complete. The cellular phone 301 can then operate on the power from the rechargeable battery 300.

Besides the benefits described above, in this embodiment the battery pack 300 also provides ergonomic benefits by making the cellular phone 301 easier to hold. The combination of a rechargeable battery 300 and a battery pack 299 also provides other benefits. The combination can provide the cellular phone 301 with high bursts of power that the rechargeable battery 300 or the battery pack 299 alone may be unable to provide. High bursts of power are needed when the cellular phone 301 rings.

Figure 48:
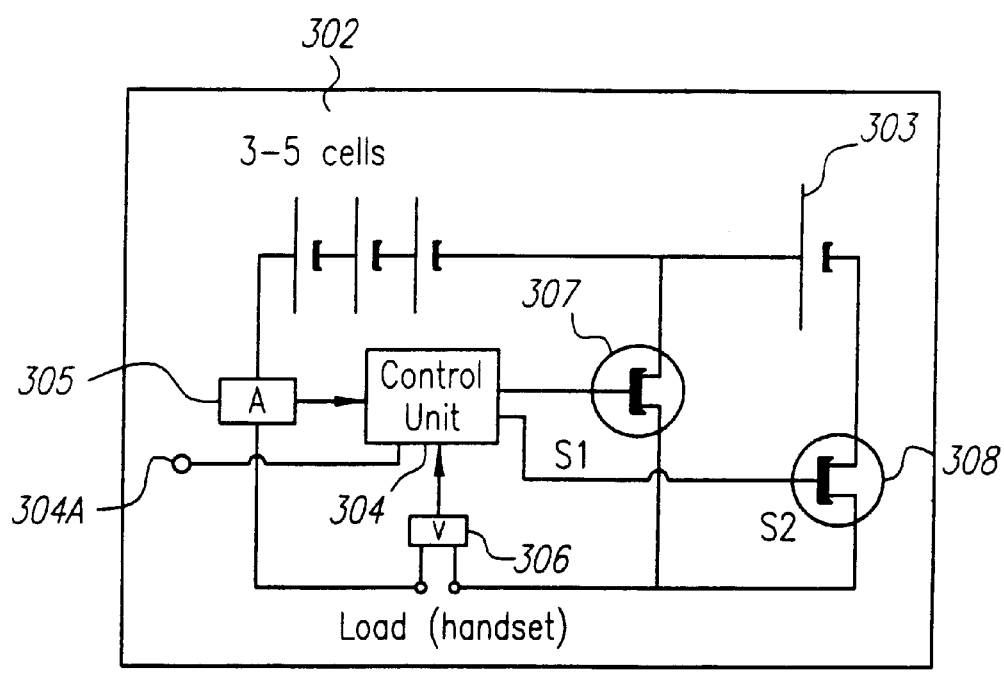

Referring now to FIG. 48, the schematic diagram of the control circuit shows a plurality of metal-air battery cells 302 connected in series, an auxiliary battery cell 303, a control unit 304, an amp-meter 305, a volt meter 306, output 304A and two switches 307 and 308. This control circuit for a metal-air battery pack prevents the electronic device user from inadvertently charging the battery pack (not shown). The control circuit also provides for additional power through an auxiliary battery cell 303 when more power is needed. The control circuit measures the flow of current through the circuit and also the voltage across the electronic device through the amp-meter 305 and the volt meter 306. The control unit 304 can also send a signal to output 304A to control the opening and closing of any shutters, the opening and closing of the battery case, or the operation of a fan when using active air flow with the battery pack. One or more battery cells 302 or 303 can be disconnected from the circuit via switches 307 and 308. Switches 307 and 308 open or close the circuit in response to a signal from the control unit 304, and the control unit 304 sends a signal to switches 307 and 308 based upon signals from the amp-meter 305, the volt meter 306, and/or the electronic device.

The control circuit has three modes of operation, an off mode, a low mode and a high mode. The control unit 304 switches the circuit between the different modes. When the circuit is in the off mode, both switches 307 and 308 are open and battery cells 302 and 303 are electrically disconnected from the electronic device. When the circuit is in low mode,—switch 307 is closed and switch 308 is open—connecting battery cells 302 to the electronic device. When the circuit is in high mode, switch 307 is open and switch 308 is closed, connecting battery cells 302 and 303 to the electronic device.

If the control unit 304 senses a flow of current in the reverse direction of normal discharge, the control unit 304 switches the circuit into the off mode. A flow of current in the opposite direction may indicate that the user is attempting to recharge the battery pack. To prevent the recharging of battery cells 302 and 303, the control unit 304 opens switches 307 and 308, which opens the control circuit and stops the flow of current through battery cells 302 and 303.

When the voltmeter senses a voltage of zero across the electronic device and the circuit is in off mode, the control unit 304 switches the circuit to low mode. A voltage of zero across the electronic device may indicate that the electronic device has been disconnected from the recharging device. When voltage across the electronic device is above 4.5 volts, or an alternative upper operating voltage, for more than 30 seconds, the control unit 304 switches the circuit to low mode. When the voltage across the electronic device drops below 3.6 volts, or an alternative lower operating voltage, the control unit 304 switches the circuit to high mode. Alternative upper and lower operating voltages may be used depending on the specific power requirements of the electronic device.

While not necessary to practice the invention, it is preferable that the circuit be configured to include quantitative limitations, depending on the power recommendations of the electronic device. For example, in a typical cellular phone, it is preferable that the switching time be less than 0.5 $\mu$ seconds. It is preferable that switching between high mode and low mode be accomplished by first closing the open switch and then opening the closed switch, thereby ensuring that the electronic device will not become disconnected during the switching process. It is also preferable that the voltage drop across switch 308 will not exceed 20 mV at 2A, and the voltage drop across switch 307 will not exceed 50 mV at 0.3A. It is preferable that the control unit 304 send a signal to output 304A to open any shuttering mechanism, expand the battery case, or turn on a fan when the average current through the circuit is greater than 0.2A for more than 20 seconds. This ensures adequate air access during higher current demands. Likewise, the control unit 304 closes the shutters, compacts the case or turns off the fan when the current is less than 0.1A for more than 20 seconds.

In an alternative embodiment not illustrated, the battery pack has a switch, which is connected to the electrical circuitry of the battery pack and controls the voltage of the battery pack. Different electronic devices operate on different voltages, making one battery configuration suitable for only a very limited number of electronic devices.

The switch can be connected to a transformer, which converts the output voltage to the desired voltage. The switch can be located on an outer surface of the battery pack so that the battery pack purchaser can set the switch to match the voltage recommendations of the electronic device.

In an alternative embodiment, the switch can be connected to a control unit of an electrical schematic similar to the embodiment of FIG. 48. The switch determines the operating voltage through which the control unit either connects or disconnects one or more auxiliary battery cells.

Note that various embodiments described above and below provide a space adjacent to a plane defined by a layer of one or more battery cells with the plane coinciding with the surface of the battery cells through which oxygen is taken up (call it the oxygen uptake surface). Some battery cells may have more than one planar surface and there is no reason why the surface(s) could not be curvilinear, or piecewise planar or piecewise curvilinear. The space may be bounded between this plane and another layer of battery cells, or between the plane and a case wall, partition, or other obstruction. The space, in the embodiments discussed, is in communication with the outside atmosphere via holes in a case or some other boundary such as a porous or permeable material. The space may be variously characterized as a "plenum" or "conduit" or any other suitable term.

As previously discussed, the process by which oxygen arrives at the surface of the battery cell(s) through this oxygen uptake surface may be driven by either bulk flow or diffusion processes or a combination of both. Bulk flow may arise due to natural convection, air currents in the ambient atmosphere, or movement of the attached appliance being powered. Natural convection can be driven by heat from the appliance, heat from the user's body, heat from the battery cells themselves, or unsteady processes such as movement of the battery from a cold environment to a warm one or vice versa.

The process of moving oxygen at the required rates from the outside of the battery pack case, through the defined space, to the oxygen uptake surfaces of the battery cells may be driven almost entirely by diffusion. Such situations may, for example, exist where the current rate is low (and battery and appliance heat output low), when the ambient air is still, and/or when the battery is stationary. The process may also be dominated by the bulk flow of air through the defined space under conditions where the ambient air is moving, a temperature difference between the battery pack and the ambient air exists, etc. as discussed.

Provision of a minimal width of the defined space is important under conditions of diffusion-dominated transport of gases as well as bulk-flow dominated transport of air through the defined space. In the case of diffusion-dominated transport, the partial pressure gradient drives the diffusion. The width of the space is essential if a non-zero gradient is to exist at the battery cell holes remote from the case openings. That is, if the defined space is too narrow, the battery cell holes near the case openings will drive the partial pressures of the entire local space to levels very close to those at the holes themselves suffocating the holes further from the case openings.

Provision of a minimal width of the defined space is important under conditions of bulk-flow-dominated transport of gases. In this case, the space can be considered a flow channel and if it is made sufficiently wide, the friction is sufficiently low for the required oxygen supply rates.

In practice, it has been found that the minimal spacings discussed above work. It is believed that oxygen supply is due to a combination of bulk flow and diffusion. In any event, it has been found that free openings in the case and the minimal dimensions provided for the defined space will provide adequate oxygen supply.

Metal-air battery cells require small amounts of oxygen even when they are not powering an electronic device, e.g., when they are stored. Cells that are completely deprived of oxygen may appear dead when the battery is activated and current is demanded. It may take several minutes of exposure to oxygen for the battery cells to be fully functional. On the other hand, providing the cells with an abundant source of oxygen is also not desirable since that may cause the cells to desiccate or unnecessarily discharge.

This presents a problem for packaging. The solution is to package the battery in such a way as to limit air exchange just enough to satisfy the minimal oxygen demand of an idle battery. In zinc-air button cells, this is accomplished by placing a porous tape over the hole in the cell and packaging the cell in a package that permits gas exchange with ambient air. This is not very practical for a battery pack such as described in the instant specification.

Exposure to carbon dioxide ($CO_2$) can also negatively affect the performance of metal-air battery cells. Carbon dioxide, when brought into contact with the electrolyte of the cell, combines with the electrolyte to form carbonates. Potassium carbonate reduces the conductivity and alkalinity of the electrolyte which results in a cell with poorer cell polarization characteristics. Further, potassium carbonate may deposit carbonate crystals in the pores of the air electrode which may cause leaks and shorten the life of the air electrodes. The presence of carbonates in the electrolyte decreases the voltage of the battery cells and can even cause total failure.

Ambient air contains approximately 400 ppm of $CO_2$ and may react with KOH (an electrolyte) to form potassium carbonate ($K_2CO_3$).

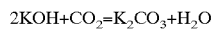

$$2KOH+CO_2=K_2CO_3+H_2O$$

One solution to this problem of exposure to atmospheric conditions is to place the battery pack case in a sealed, plastic bag during storage. Referring to FIG. 48A, a gas impermeable bag 500 has a hole 505 that is covered by a gas permeable sticker 510. The bag 500 is constructed of a material with a moisture permeability of less that 0.5 mg $H_2O$/day/300 cm$^2$. The size of the hole 505 and the material properties of the sticker 510 are such that the moisture permeability of the embodiment should be less than 3 mg $H_2O$/day/300 cm$^2$. The gas-permeable sticker permits hydrogen gas produced by zinc corrosion to escape and oxygen to enter the bag at the required minimal rate.

Alternatively, the sticker can be replaced by a gas-permeable foil with a hole pricked in the sticker. The hole provides the means for the exchange of gases. To ensure that the foil does not become damaged, the foil should be made of material that does not tear easily, such as a foil laminate. The foil can be attached to the package by an adhesive, chemical solvents, heat sealing, etc. Since one of the advantageous features of this package is to limit battery cell desiccation, the seal between the foil and the package should be strong, permanent, and water tight. In yet another alternative embodiment (not shown) and depending on the gas permeable properties of the material, portions of the bag can be made of a gas-permeable material, thereby eliminating the need for a sticker or a foil.

To reduce the presence of $CO_2$ in packages as described above, a $CO_2$ scrubber may be packaged with the battery pack. For example, a pouch, pad, plaque or other device for containing a $CO_2$ scrubbing agent can be placed in the package with the battery pack. This pouch may be made of gas permeable material such as a non-woven cloth, gas-permeable membrane, or a net. The scrubbing agent should not absorb water since absorption of moisture may cause the cell to dry out prematurely. Examples of suitable materials are $Ca(OH)_2$ $Mg(OH)_2$, ZnO or soda-lime. The scrubbing agent can also be packaged in a variety of ways. For example, it could be formed into a pellet, wrapped in or impregnated onto a support, or placed directly in the battery pack packaging in finely divided form as a coating on cells or the pack inner surface. The $CO_2$ scrubbing agent can be introduced into one of the cell's components or the pack casing components.

Figure 49:
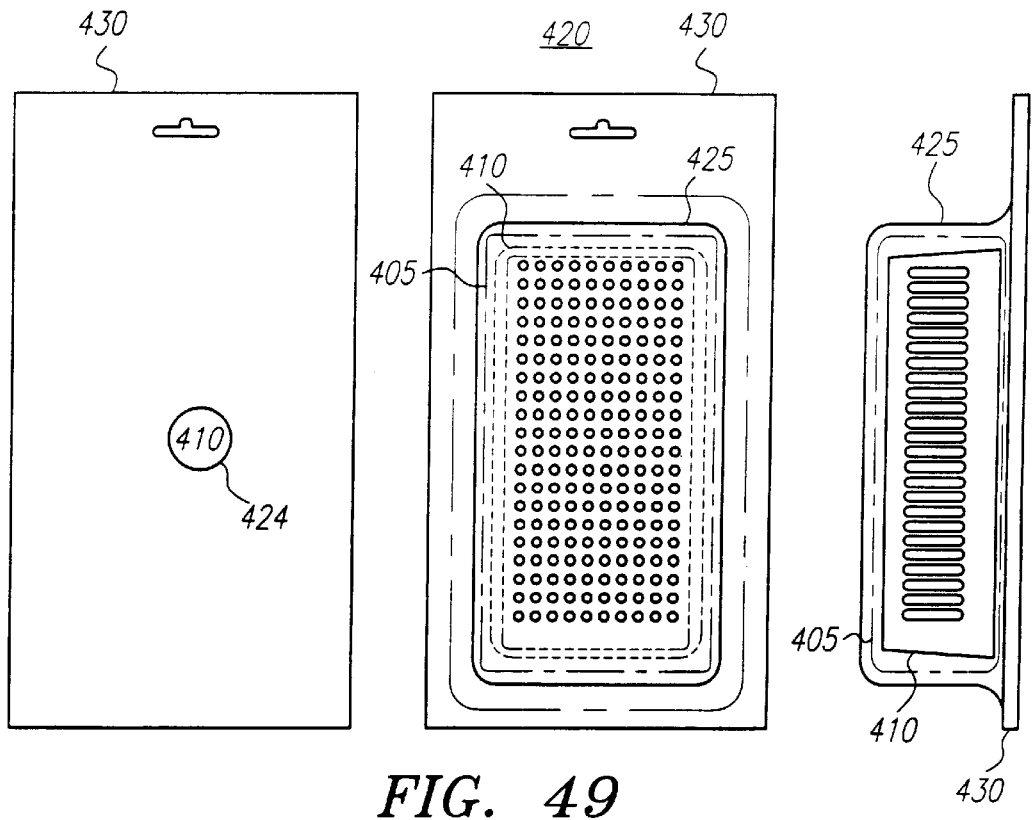
FIG. 49 is a set of illustrations from back, front and side of an embodiment of a packaging configuration.

Referring now to FIG. 49, the battery pack 410 is encased in a semi-permeable plastic envelope 405 and further encased in an outer plastic package 420. The plastic envelope 405 of semi-permeable material is sealed using conventional techniques such as adhesive, chemical solvents, heat sealing, etc. The outer package 420 is a common type of display package with a plastic cover 425 and a cardboard backing 430. The cardboard backing 430 has a hole to allow air gases to exchange with the interior of the package 420. The rate that moisture from the cells of the battery pack 410 leaves the package can be altered by changing the size of the hole 440, the porosity or permeability of the backing 430, and the permeability of the envelope 405. Note that alternatively, the envelope 405 can be adequately permeable overall or largely impermeable with a small permeable portion (not shown) affixed to it. Alternatively, the envelope 405 can contain some of the features described above. For example, the envelope can have an opening with a sticker covering the opening. Further, the outer package 420 can also incorporate these alternative features to reduce desiccation. To reduce $CO_2$ concentration, a pouch of a $CO_2$ scrubbing agent can be placed in the semi-permeable envelope 405 or between the envelope 405 and the outer package 420, or both.

Figure 50:
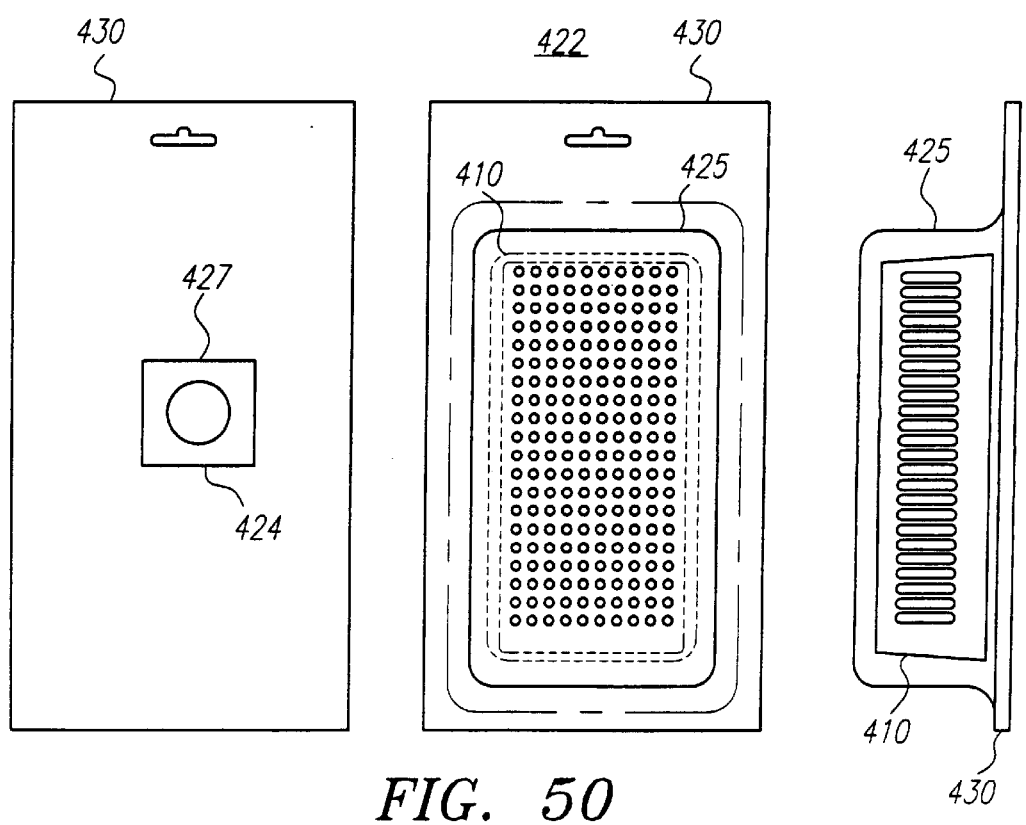
FIG. 50 is a set of illustrations from back, front and side of another embodiment of a packaging configuration.

Referring to FIG. 50, in an alternative embodiment similar to the embodiment of FIG. 49, the battery pack 410, without the envelope 405, is encased in a package 422 having a cardboard backing with an opening 424. The package 422 is completely gas-impermeable except for the opening 424, which is covered by a gas-permeable film 427. By adjusting the size of the opening 424 and/or the material properties of the film 427 that covers it, the gas exchange rate can be controlled. That is, the rate can be adjusted to allow oxygen at the minimum rate needed to provide for a minimum voltage required by the battery pack 410. In fact, the area of the film 427 through which gas exchange takes place can be adjusted precisely by adjusting the size of the opening 424 or by using a film 427 with different material properties.

Although the embodiment of FIG. 50 illustrates a package with an opening 424 on the cardboard backing of the package 422, the opening of the package 422 can be placed on other parts of the package 422, instead. Further, the gas permeable film can be replaced with a gas impermeable material having a small (metering) hole sized to limit the exchange of gases to the minimum rate required. A pouch of a $CO_2$ scrubbing agent can also be placed within the package 422.

In another alternative (not illustrated) stickers are used to cover the air holes and slots of the battery case. When the stickers are removed, the holes become unblocked. The stickers use an adhesive that leaves no glue residue on the battery pack case after removal.

The following examples are descriptions of the use of the present invention. These examples are not meant to limit the scope of the invention, but are merely examples of specific embodiments.

EXAMPLE 1

A battery pack that includes four single use zinc-air battery cells, similar to the embodiment of FIGS. 2A–5A, powers a Nokia 6100 or a Nokia 5100 mobile phone and provides up to 16 hours talk time or up to 800 hours of stand-by time. The nominal voltage for the battery pack is 5.6 volts, and the operating voltage is 3.6 volts. The interface of the battery to the handset is similar to those of the Nokia batteries that the battery pack is intended to replace. The battery pack design conforms to all the recommendations of the handset producer regarding mounting and dismounting of the battery and the proper electrical and electronic connections between the battery and the phone.

The zinc-air battery cells are arranged in two layers of two battery cells each. The air holes of the battery cells at the bottom layer face the plenum between the layers. The air holes of the topmost battery cells face the major surface of the battery pack case. The spacing between the two layers of battery cells is 3.5 mm. The spacing between the topmost battery cells and the inside major surface of the battery pack case is at least 0.5 mm.

Fixtures in the battery pack case hold the battery cells in their designed positions with a defined space between them. Battery cell fixtures do not limit air flow in the 3.5 mm plenum between the two battery cell layers. At most, battery cell fixtures block 5% of the open area between the battery cells. Similarly, battery cell fixtures do not limit airflow in the 0.5 mm space between the top layer of battery cells and battery cover. Again, at most, battery cell fixtures block 5% of the open area. Battery cell fixtures prevent contact between battery cells, as such contact may cause a short circuit. Battery cell fixtures are designed to facilitate battery assembly.

The electrical connections between the battery cells may be spot welded bus bars or soldered copper wires or any suitable device. The negative pole (the side without air holes) of one battery cell (the first) may be connected to the negative contact of the electrical contact board by a copper wire soldered to a bus bar spot welded to the battery cell. The other battery cells are connected in series by an insulated spot welded bus bar. The insulation prevents short circuits between the bus bar and the other pole of the same battery cell. The positive pole (the side with the air holes) of the last of the series of battery cells may be connected to the positive contact of the electrical contact board by a copper wire soldered to a bus bar spot welded to the battery cell. Preferably, the bus bar should not block an air hole and the bus bar should not block the airflow in the space between the battery cells.

When slots located on opposite sides of the battery pack case are used in place of, or together with, air holes in the battery pack case, the air access slots face the spacing between the two layers of battery cells. The total open area of the air access slots is not smaller than 150 mm$^2$ per side, or 300 mm$^2$ for the entire battery pack case. The slots are located on the concave surface of the side of the battery pack case. When the slot area is partially covered (by the user's hand or by a holster) the concave area provides a space through which air can flow or diffuse.

Small objects, as well as dust and liquid, may enter the battery pack through the slots and other air access holes. A battery guard is constructed of porous material that covers the holes and slots, keeping objects and liquids out while letting air in. The battery guard is preferably constructed from sheets of material which cover the holes and slots from the inside. Alternatively, the battery guard can be injected into the holes and slots. The battery guard material is hydrophobic and has porosity to air of greater than 80%. The battery guard material is also resistant and impermeable to KOH. Additionally, the battery guard's final color should match the color of the specific electronic device to be powered.

During battery usage, the oxygen consumption varies from a large amount when the user is talking to a very small amount when the phone is in stand by mode. Covers for the slot and hole openings can be incorporated into an electro-mechanical system that fits the open area needed for the required consumption.

The battery cells contain gelled aqueous KOH solution. Although the battery cells should not leak, minor amounts of solution may escape when the battery is exposed to extreme atmospheric or usage conditions. To contain such leaks within the battery pack, absorbent material can be used. The absorbent material needs to be placed properly inside the battery pack case and be able to contain a leak of 1 cc solution. The absorbent material can also contain a gelling agent. and a neutralizing agent

EXAMPLE 2

A standard Philips telephone was modified and fitted with a sub-assembly containing five serially-connected, prismatic zinc-air battery cells, arranged in a first stack of three battery cells and a second stack of two battery cells, each battery cell having a capacity of 2.5 Ah. The dimensions of the individual battery cells were approximately 46×27×4 mm with an air electrode surface area of about 9–10 cm² each. The battery cells within the sub-assembly were spaced apart to ensure adequate air access to each battery cell. The battery pack case was perforated with a plurality of holes along its entire surface. In this battery pack configuration and with this air ingress design, the phone functioned poorly with frequent disconnections.

When, in addition to the perforations described above, the side of the battery pack case was perforated with round holes, the phone performed satisfactorily without disconnections.

When this telephone was tested under an analog profile with constant current of 470 mA to a cut-off of 0.9 V, a total of about 340 minutes were obtained, equivalent to about 2.5 Ah of capacity.

The open circuit voltage (OCV) of zinc-air battery cells is about 1.4 V. The usable operating voltage of individual zinc-air battery cells is 1.2–0.9 V, depending on extent of discharge.

The present invention can be applied to all telephones having cavities for receiving metal-air battery cell sub-assemblies, such as:

| Type of Phone | No. of Battery Cells | Operating Voltage |
| --- | --- | --- |
| Alcatel | 4 | 4.8–3.6 |
| Philips | 5 | 6.0–4.5 |

Some of these phones operate on analog mode and some on digital. The same phone model may be analog in Europe and digital in the United States or vice versa. A typical cellular phone analog mode draws a current of 0.47 A but is variable dependent on location. While there are a number of different digital profiles, a typical one draws an average of 0.25–0.30 A during its operating cycle.

EXAMPLE 3

A standard Motorola MicroTac® cellular phone was modified and fitted with a battery pack containing six serially-connected, prismatic zinc-air battery cells, arranged in two layers of three battery cells each, each having a capacity of 2.5 Ah. The pack was fitted to sit flush with the wall adjacent to the interior of the phone. The dimensions of the individual battery cells were approximately 46×27×4 mm with an air electrode surface area of about 9–10 cm² each. The battery cells within the pack were spaced apart to ensure adequate air access to each battery cell. The battery pack case was perforated with a plurality of holes along its entire surface. In this battery configuration and with this air ingress design, the phone functioned poorly with frequent disconnections.

When, in addition to the perforations described above, the side walls of the battery pack were perforated with round holes and/or a strip of plastic approximately 2 mm in width was removed along the entire length of the battery pack (approximately 10 cm) and/or several smaller strips were removed from the battery pack's sides, the phone performed satisfactorily without disconnections.

When these battery packs were tested under an analog profile with constant current of 470 mA to a cut-off of 0.9 V, a total of about 340 minutes were obtained, equivalent to about 2.5 Ah of capacity.

The open circuit voltage (OCV) of zinc-air battery cells is about 1.4 V. The usable operating voltage of zinc-air cells is 1.2–0.9 V, depending on extent of discharge.

| Type of Phone | No. of Battery Cells | Operating Voltage of Battery Pack |
| --- | --- | --- |
| Motorola MicroTac ® | 6 | 7.2–5.4 |
| Motorola StarTac ® | 4 | 4.8–3.6 |
| Ericsson 300 | 6 | 7.2–5.4 |
| Ericsson 600 | 5 | 6.0–4.5 |

Some of these phones operate on analog mode and some on digital. The same phone model may be analog in Europe and digital in the United States or vice versa. A typical cellular phone analog mode draws a current of 0.47 A, but is dependent on location. While there are a number of different digital profiles, a typical one draws an average of 0.25–0.30 A during its operating cycle.

It will be evident to those skilled in the art that the invention is not limited to the details of the foregoing illustrative embodiments, and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A battery case for housing at least one metal-air battery cell having a respective gas-exchange wall through which gas exchange between an interior and exterior of the at least one metal-air battery cell takes place, said battery case, comprising:

a holder configured to support the at least one battery cell in a predefined position inside said case;

said case having an external wall;

said holder and a remainder of said case being configured to define an air conduit between said external wall and said gas-exchange wall, said conduit having a clearance equal to a minimum dimension in a direction substantially normal to said at least one metal-air battery cell gas-exchange wall;

said external wall having at least one aperture providing gas-communication between an exterior of said housing and said air conduit;

a maximum diffusion path length being defined as a distance between a portion of said at least one metal-air battery cell gas-exchange wall that is most remote from said at least one aperture to said portion of said at least one metal-air battery cell;

said holder and said remainder being further configured such that said maximum diffusion path is no greater than twenty times an overhead clearance provided by said conduit.

2. A battery case as in claim 1, wherein said overhead clearance is maintained by a spacer.

3. A battery case as in claim 2, wherein said spacer is a diffuser.

4. A battery case as in claim 1, wherein:

said at least one opening is at least two openings in said external wall said at least two openings having a combined area of at least 300 mm2/watt of peak power capacity of the at least one battery cell exchanging air gases through said at least two openings.

5. A battery case for supporting at least one metal-air battery cell having at least one surface with holes for permitting diffusion of gases therethrough, said case comprising:

a holder configured to support the at least one battery cell in a predefined position inside said case;

said holder and a remainder of said case being configured to define, together with the at least one battery cell, an air conduit inside said case; and openings in a wall of said case in communication with said air conduit, at least two of which lie at opposite ends of said conduit, thereby defining an air passage of such size and shape as to permit significant thermal convection therethrough when said at least one battery cell generates heat during discharge.

6. A battery case as in claim 5, wherein a first and second openings are joined by a straight line that passes through said conduit without touching boundaries of said conduit.

7. A battery case as in claim 6, wherein said conduit has a first major axis defining a first linear flow path linking said first and second openings and said first and second openings lie directly adjacent said conduit, whereby a flow resistance of said conduit is minimized.

8. A battery case as in claim 7, wherein said openings are sized to be a substantial fraction of a hydraulic diameter of said conduit.

9. A battery case as in claim 8, wherein said first and second openings lie on opposing ends of said conduit and said conduit is characterized by a ratio of square of hydraulic diameter of flow cross section to flow length between said first and second openings of at least 0.5 mm.

10. A battery case as in claim 7, wherein said openings have respective hydraulic diameters of at least 3 mm.

11. A battery pack, comprising:

a housing with apertures permitting gas exchange between an interior and an exterior thereof;

electrochemical cells that exchange gas with ambient air supported inside said housing, each of said cells having one gas-exchange wall coinciding with a major plane thereof and a back surface opposite said gas-exchange wall, said gas-exchange wall being such that gas exchange between an interior and exterior of said cells may occur;

a first and second of said cells being arranged with said back surfaces adjacent and held in a position such that said gas-exchange wall of said first of said cells faces said housing defining a first air space and said gas-exchange wall of said second of said cells faces a second air space;

a thickness of said second air space being substantially thicker than a thickness of said first air space.

12. A battery pack as in claim 11, wherein said second air space is at least 0.5 mm in thickness, said thickness being a dimension normal to said second cell gas-exchange wall.

13. A battery pack as in claim 12, wherein said second air space is at least 2.5 mm in thickness, said thickness being a dimension normal to said second cell gas-exchange wall.

14. A battery pack as in claim 11, wherein said second air space is at least 4 mm in thickness, said thickness being a dimension normal to said second cell gas-exchange wall.

15. A battery pack, comprising:

a housing with apertures permitting gas exchange between an interior and an exterior thereof;

prismatic metal-air electrochemical cells supported inside said housing, each of said cells having at least one gas-exchange wall coinciding with a major plane thereof and a back surface opposite said gas-exchange wall, said gas-exchange wall being such that a gas exchange between respective interiors and exteriors of said cells may occur;

a first and second of said cells being arranged with said gas-exchange walls thereof facing and opposite each other such that their gas-exchange walls define an air space therebetween;

a thickness of said air space being a minimum of 0.5 mm, said thickness being a dimension normal to said gas-exchange walls of said first and second of said cells.

16. A battery pack, comprising:

a housing with at least one aperture permitting a gas exchange between an interior and an exterior thereof;

prismatic metal-air electrochemical cells supported inside said housing, each of said cells having at least one gas-exchange wall coinciding with a major plane thereof and a back surface opposite said gas-exchange wall, said gas-exchange wall being such that a gas exchange between respective interiors and exteriors of said cells may occur;

a first and second of said cells being arranged with said gas-exchange walls thereof facing and opposite each other such that their gas-exchange walls define an air space therebetween;

a thickness of said air space being a minimum of 2 mm, said thickness being a dimension normal to said gas-exchange walls of said first and second of said cells.

17. A battery pack as in claim 16, wherein a distance between a portion of said exchange surfaces that is most remote from said at least one aperture and said at least one aperture is no greater than twenty times said thickness.

18. A battery pack as in claim 17, wherein:

said at least one aperture is at least two apertures on opposing ends of said air space to define a flow conduit for bulk flow of air; and said conduit is characterized by a ratio of square of hydraulic diameter of flow cross section to flow length between said at least two apertures of at least 0.5 mm.

19. A battery pack as in claim 17, wherein:

said at least one aperture has a combined area of at least 300 mm2/watt of peak power capacity of said cells exchanging air gases through said at least one aperture.

20. A battery case as in claim 17, wherein:

said at least one aperture has a combined area of at least 300 mm2/watt of peak power capacity of said cells exchanging air gases through said at least one aperture;

said at least one aperture is at least two apertures on opposing ends of said air space to define a flow conduit for bulk flow of air; and said conduit is characterized by a ratio of square of hydraulic diameter of flow cross section to flow length between said at least two apertures of at least 0.5 mm.

21. A battery case as in claim 17, wherein at least some of said at least one aperture is immediately adjacent said air space, thereby defining a contiguous unobstructed path for exchange of air gases.

22. A battery case for metal-air battery cells that expand during a discharge cycle thereof, said case comprising:

a housing containing a support structure for supporting metal-air battery cells;

said support structure containing a plurality of projections into which the battery cells are inserted such that said projections secure the battery cells to said support structure;

said projections containing recesses for receiving the battery cells; and said projections being shaped such that said recesses allow for the battery cells to expand without resulting in a substantial distortion of said support structure.

23. A battery case as in claim 22, wherein the battery cells are aligned in layers such that the longitudinal axes of the cells parallel to the layers defines a plenum between the battery cells.

24. A battery case for metal-air battery cells that expand during a discharge cycle thereof, said case comprising:

a housing containing a support structure for supporting metal-air battery cells;

said support structure containing a plurality of projections into which the battery cells are inserted such that said projections secure the battery cells to said support structure; and said support structure being configured and of such material that said support structure may flex sufficiently to accommodate the expansion without permitting the battery cells to become unsupported thereby.

25. A battery case for metal-air battery cells, said case comprising:

a housing containing a support structure for supporting a plurality of metal-air battery cells;

said support structure having a first and a second support portions, each of said portions having recesses for receiving a respective one of said battery cells;

said first and second support portions being linked by an integral hinge; and said first portion and said second portion having integral standoffs positioned to hold said battery cells held in said first portion a specified distance from said battery cells held in said second portion when said first and second portions are arranged in a parallel relationship inside said housing.

26. A battery case as in claim 25, further comprising:

diffusing elements positioned above said respective battery cells;

said recesses defining trays into which said respective battery cells fit;

said diffusing element being formed of a material such that a gas exchange through said diffusing elements and between said respective battery cells and an outside of said case is permitted.

27. A battery case as in claim 25, wherein said recesses define trays into which the respective battery cells fit, said trays being closed with an absorbent material attached thereto, whereby said trays are able to hold any spilled substance emerging from said respective battery cells.

28. A battery case as in claim 25, wherein said recesses define trays into which the respective battery cells fit, an absorbent material being placed below the respective battery cells in said trays, whereby said trays are able to hold any spilled substance emerging from the respective battery cells.

29. A battery case as in claim 28, further comprising:

diffusing elements positioned above the respective battery cells, said diffusing elements being formed of a material such that a gas exchange through said diffusing elements and between the respective battery cells and an outside thereof is permitted.

30. A battery case as in claim 25, wherein a gas permeable liquid impermeable membrane is attached to said tray, enclosing the respective battery cells, whereby an intrusion of liquid into, or leakage of liquid from, the battery cells is prevented.

31. A battery case as in claim 30, further comprising:

diffusing elements positioned between the respective battery cells and said membrane, said diffusing element being formed of a material such that a gas exchange through said diffusing element and between the respective batter cells and an outside of said case is permitted.

32. A battery case as in claim 25, wherein said integral hinge provides at least 180 degree angular movement between the longitudinal axes of said first support portion and said second support portion.

* * * * *